(12) United States Patent
Yabe et al.

(10) Patent No.: US 7,188,542 B2
(45) Date of Patent: Mar. 13, 2007

(54) LINER MOTION DEVICE, ROLLING DEVICE AND SEPARATOR FOR ROLLING DEVICE

(75) Inventors: Toshikazu Yabe, Kanagawa (JP); Hiroyuki Ito, Kanagawa (JP); Tuyoshi Saito, Kanagawa (JP); Toyohisa Yamamoto, Kanagawa (JP)

(73) Assignee: NSK Ltd., Tokyo (JP)

( * ) Notice: Subject to any disclaimer, the term of this patent is extended or adjusted under 35 U.S.C. 154(b) by 127 days.

(21) Appl. No.: 11/012,285

(22) Filed: Dec. 16, 2004

(65) Prior Publication Data

US 2005/0166695 A1    Aug. 4, 2005

Related U.S. Application Data

(62) Division of application No. 10/292,462, filed on Nov. 13, 2002, now Pat. No. 6,854,351.

(30) Foreign Application Priority Data

| Nov. 14, 2001 | (JP) | ................. P. 2001-348394 |
| Apr. 10, 2002 | (JP) | ................. P. 2002-107967 |
| May 24, 2002 | (JP) | ................. P. 2002-150987 |
| Jul. 4, 2002  | (JP) | ................. P. 2002-195817 |

(51) Int. Cl.
  *F16H 1/24* (2006.01)
(52) U.S. Cl. ........................... 74/424.82; 384/15
(58) Field of Classification Search ................. 74/424.82–424.88; 384/13, 43–45
  See application file for complete search history.

(56) References Cited

FOREIGN PATENT DOCUMENTS

| JP | 8-226516    | 9/1996 |
| JP | 2001-193814 | 7/2001 |
| JP | 2001-248708 | 9/2001 |

*Primary Examiner*—Lenard A. Footland
(74) *Attorney, Agent, or Firm*—Sughrue Mion, PLLC

(57) ABSTRACT

A liner motion device has a liner motion element fitted on a shaft and moving straight along the shaft; a plurality of balls which are retained in a rolling element groove formed on the inner side of the liner motion element and roll over between the rolling element groove and the shaft; a separator interposed between the rolling elements; and, a circulating path formed in the liner motion element through which the rolling elements are circulated from one end of the rolling element groove to the other, wherein the separator is a product of a synthetic resin containing a lubricating oil in an amount of 3 to 25% by volume.

4 Claims, 13 Drawing Sheets

LINER MOTION DEVICE, ROLLING DEVICE AND SEPARATOR FOR ROLLING DEVICE

This is a divisional of application Ser. No. 10/292,462 filed Nov. 13, 2002 now U.S. Pat No. 6,854,351.

BACKGROUND OF THE INVENTION

1. Field of the Invention

The present invention relates to a direct-acting device such as linear guide and ball screw to be incorporated in industrial machines, etc. and more particularly to a technique for reducing noise.

The present invention also relates to a rolling device for use in conveyance system and positioning device in semiconductor producing machine and sputtering device, plasma CVD device and ion planting device in liquid crystal, semiconductor and solar cell producing apparatus and more particularly to a low-dust generating and high durability rolling device which can be preferably used in vacuum atmosphere.

The present invention also relates to a rolling device for use in conveyance system and positioning device in semiconductor producing machine and sputtering device, plasma CVD device and ion planting device in liquid crystal, semiconductor and solar cell producing apparatus and more particularly to a low-dust generating, low-outgassing and high durability rolling device which can be preferably used in vacuum atmosphere or clean room.

The present invention also relates to a rolling device such as linear guide and ball screw to be incorporated in industrial machines and a separator for rolling device and more particularly to an effective technique which can be used in a clean atmosphere such as clean room, semiconductor producing machine, liquid crystal panel producing machine and hard disc producing machine.

2. Description of the Related Art

As shown in FIG. 1 for example, a linear guide device 110 comprises a guide rail 101 having a rolling groove 103 provided on the outer surface thereof, and a slider 102 disposed across the guide rail 101. The slider 102 is partly opened on the surface thereof opposed to the rolling groove 103 of the guide rail 101 to form a ball circulating path 104 having a racing track-shaped section with the rolling groove 103 of the guide rail 101. Into the ball circulating path 104 are received rollably a large number of balls B.

Alternatively, as shown in FIG. 2, a ball screw device 120 comprises a ball nut 112 provided surrounding a thread 111, and a plurality of balls B rollably disposed in the space defined by a thread groove 112a formed spirally on the inner surface of the ball nut 112 and a thread groove 111a formed spirally on the outer surface of the thread 111 opposed to the thread groove 112a. The ball nut 112 has a ball tube 113 having an external shape of U mounted with its both ends extending to the thread groove 111a of the thread 111. The balls B make a repeated circulation. In some detail, the balls B run around the thread 111 plural times inside the ball nut 112. The balls B are then caught by one end of the ball tube 113 from which they then pass through the ball circulating path 118. The balls B are then returned to the thread groove 111a of the thread 111 from the other end of the ball tube 113.

Such a linear guide device 110 or ball screw 120 normally has a separator interposed between the balls B to eliminate noise of collision of balls during driving. For example, FIG. 3 is an enlarge view illustrating the interior of the ball circulating path 104 of the linear guide device 110. A train of balls B with a separator 130 interposed therebetween is formed. The separator 130 has a concave surface 131 having an arc section formed on both sides thereof corresponding to the outer surface of the ball B. The ball B is rollably retained by the concave surface 131 when circulating through the ball circulating path 104.

The aforementioned separator 130 is a product of a resin composition containing a proper reinforcing material. As the resin composition there has heretofore been normally used one comprising as a base resin a polyamide resin such as nylon 66. However, a polyamide resin itself has poor sliding properties. While there is a sufficient amount of a grease, the liner motion device can operate stably with the lubricating action of the grease. However, when the grease flows out of the liner motion device with water to an extent such that only a slight amount of the grease is left, there occurs a sudden deterioration of the operating characteristics of the liner motion device, possibly increasing the noise level due to running.

A ball screw, which is one of rolling devices, comprises a plurality of balls (rolling elements) disposed in a spiral space (hereinafter referred to as "ball rolling space") defined by a thread groove (track) on the thread (inner member) and a thread groove (track) on the ball screw nut (outer member). In this arrangement, power is transmitted between the thread and the ball screw nut when the balls are rolled and circulated. Since the balls are rolled with slippage developed by the resultant of force in the rotary direction and force in the axial direction, the contact area of the ball with the both thread grooves (both tracks) defining the ball rolling space undergoes rolling friction and sliding friction at the same time.

Thus, a lubricant such as grease and solid lubricant is used in the interior of the ball screw. This lubricant lessens the coefficient of friction between the thread and ball screw nut and the balls, enhancing the durability (life) of the ball screw. However, when as the lubricant for ball screw to be used in vacuum atmosphere there is used a grease, the evaporation of the oil content of the grease or the scattering of the grease itself can cause defects such as deterioration of lubricating properties and pollution of the working atmosphere.

In order to eliminate these defects, it has been practiced to coat at least any one of the raceway surfaces such as thread groove on the thread and thread groove on the ball screw nut and the surface of the balls with a solid lubricant such soft metal (e.g., gold, silver, lead), carbon and molybdenum disulfide in film form to provide these surfaces with lubricating properties instead of using grease. Further, Japanese Patent Laid-Open No. 08-226516 discloses a ball screw comprising a lubricant film made of a fluorine-containing polymer having a functional group which can be used in vacuum atmosphere, clean atmosphere and corrosive atmosphere.

Moreover, Japanese Patent Laid-Open No. 2001-193814 discloses a liner motion device comprising a retaining peace (spacer) interposed between balls.

However, the aforementioned coat layer made of such a solid lubricant or the like is disadvantageous in that the load developed by the rolling of balls causes the coat layer to be gradually peeled off and fall off, resulting in the generation of dust.

Further, when the coat layer is peeled off or falls off as mentioned above, the site at which the rolls are rolled and make sliding contact with the thread and the ball screw nut is less lubricated. As a result, the metals come in contact with each other, causing cohesion or accelerating abrasion at the rolling and sliding site and hence deteriorating the life of the ball screw.

Moreover, the aforementioned lubricant film made of a fluorine-containing polymer having a functional group is fluidic and thus can be difficultly peeled off or fall off unlike the coat layer made of solid lubricant or the like. Thus, the ball screw having such a lubricant film is less subject to abrasion as compared with the ball screw having a coat layer made of solid lubricant or the like. In general, however, when the balls collide with each other as they roll, the adjacent balls rotate in opposite direction (reverse operation). Thus, the sliding speed of balls relative to each other is twice that of a single ball, causing a great frictional force. Accordingly, the contact of the balls with each other has a great effect on the durability of the ball screw, possibly deteriorating the life of the ball screw.

Rolling devices such as rolling bearing, linear guide device, ball spline device, ball screw device, cross roller bearing and cam follower are used in various arts.

In general, rolling devices such as rolling bearing and liner motion device are coated with a lubricating oil such as mineral oil and poly α-olefin oil or a lubricant such as grease or have such a lubricating oil or lubricant filled therein to prevent abrasion of rolling element with its mating members.

However, the system involving lubrication of rolling device with a lubricating oil or grease is disadvantageous in that when the device is operated, the lubricating oil or grease is scatted to the exterior thereof. Further, when the device is operated at high temperatures, at a high speed or in vacuum atmosphere, the lubricating oil or grease vaporizes to produce a gas, contaminating the external atmosphere. Therefore, in a use requiring a clean atmosphere such as in clean room, semiconductor producing device, liquid crystal panel producing device and food processor or in vacuum atmosphere, rolling devices which are lubricated with an ordinary lubricating oil or grease cannot be used.

Therefore, in a use requiring a clean atmosphere or in vacuum atmosphere, a rolling device comprising a retainer made of a self-lubricating composite material mixed with a solid lubricant or the like, a solid-lubricating rolling device having a film made of a solid lubricant formed on the surface of various elements constituting the rolling device (e.g., guiding surface of moving member, surface of rolling element) or a rolling device which is lubricated with a fluorine-based grease having a low vapor pressure and a small consistency is used.

These rolling devices can be used without any problems under ordinary working conditions. However, when used at high temperatures, at a high speed or in vacuo, these rolling devices cause the lubricant to be scattered or evaporated as a gas to the exterior thereof, contaminating the external atmosphere thereof. Therefore, in devices requiring a clean atmosphere such as device for use in a clean room, e.g., semiconductor producing device, liquid crystal panel producing device and hard disc producing device, vacuum devices having a rolling device exposed to vacuum such as vacuum pump, and devices which are used at high temperatures, a fluorine-based grease has been often used as a lubricant for rolling device.

A fluorine-based grease is a mixture of a base oil made of perfluoropolyether (PFPE) and a thickening agent made of polytetrafluoroethylene resin (PTFE) and thus normally has an extremely low volatility and hence is scattered or evaporated to the exterior of the rolling device in a relatively small amount. Accordingly, the fluorine-based grease can relatively difficultly contaminate the external atmosphere of the rolling device.

However, PFPE contained in the fluorine-based grease normally has a high viscosity. In other words, when such a fluorine-based grease is used as a lubricant for the rolling device, the resulting resistance to stirring is increased to raise the torque excessively, increasing the heat generation and hence expanding the members constituting the rolling device, e.g., thread, nut and rolling elements, if the rolling device is a ball screw device. As a result, the clearance between the various members is decreased, imposing excess load on the contact area of the thread and nut with the rolling elements. In particular, a ball screw device is much subject to working slippage and thus undergoes abnormal abrasion or seizing, making the rolling device unusable in a short period of time and hence making it necessary to replace the rolling device frequently to disadvantage.

When there is an increased error in mounting in a linear guide device, the contact face pressure at the rolling surface increases, making the linear guide device more subject to the aforementioned problems.

Further, the ball screw device and linear guide device make stroke movement and thus is disadvantageous in that the lubricant can easily be removed from the track surface and exhausted. In particular, the fluorine-based grease contains as a base oil PFPE, which has a small surface energy, and thus can difficultly wet the surface of the matrix, easily causing the grease to be exhausted.

A rolling bearing, particularly when used at a high speed, undergoes a raised resistance to stirring with respect to lubricants containing a base oil having a high dynamic viscosity such as fluorine-based grease. The resulting heat generation causes the internal clearance in the bearing to be reduced, making the bearing more subject to abnormal abrasion or seizing.

Further, a rolling device having a self-lubricating retainer incorporated therein causes the retainer and the rolling elements to make sliding movement relative to each other during operation. As a result, a lubricant is transferred from the retainer to the guiding surface of the moving members and the surface of the rolling elements to form a thin solid lubricant film thereon, lubricating the rolling device.

On the other hand, in a rolling device comprising a solid lubricant film, a film made of solid lubricant which has been previously formed on the guiding surface of the moving members of the rolling device or the surface of the rolling elements undergoes shearing, cleavage, etc. with the operation of the device, preventing the surfaces of the matrix from making direct contact with each other and hence lubricating the device.

As such a solid lubricant film there is used a soft metal such as gold, silver and lead, lamellar compound such as molybdenum disulfide, tungsten disulfide and graphite or fluororesin such as polytetrafluoroethylene.

However, the aforementioned soft metal or lamellar compound generates a relatively great amount of dust and thus cannot be used in a use requiring a highly clean atmosphere.

Further, a solid lubricant has different lubricating properties with different working atmospheres. For example, molybdenum disulfide can accomplish its effect in vacuo. Graphite can accomplish its effect in atmosphere. However, the semiconductor producing machine and liquid crystal panel producing machine make repeated reciprocation between atmosphere and vacuum to convey the product from one step to another, making it necessary to use a lubricant which exhibits lubricating properties both in vacuo and atmosphere. In this working atmosphere, a fluororesin is often used as a lubricant film.

In recent years, various electronic elements such as semiconductor element have attained high integration and fineness more and more. With this trend, minute particles attached to the surface of semiconductor element, etc. during production procedure have more effects on the performance, reliability and yield of the product. Therefore, rolling devices for use in places requiring a clean atmosphere as in semiconductor producing machine have been keenly required more and more to cause little particles and gases to be scattered to the exterior of the device.

In the art of liquid crystal panel, too, the same requirements as mentioned above must be met to increase the number of pixels or improve the picture quality.

However, all the aforementioned solid-lubricated rolling devices cause abrasion particles to be generated from the sliding site during the sliding of the retainer relative to the film, etc. It is unavoidable that the abrasion particles thus generated can fall off the members and then be scattered to the exterior of the device.

Further, the rolling device which is lubricated with a fluorine-based grease undergoes shearing of grease during the operation thereof. The grease thus sheared is then scattered to the exterior of the device. In recent years, the rolling devices for use in semiconductor producing machine or liquid crystal panel producing machine may be used in ultrahigh vacuum. The fluorine-based grease has no life problems but leaves something to be desired in outgassing resistance.

In the art of rolling device such as ball screw, a means for supplying a lubricant such as grease into the track surface of the nut (outer member) and the thread (inner member) on which the rolling elements are rolled to lessen rolling friction and hence enhance the durability (life) of the rolling device has been proposed.

However, there is a problem that when such a rolling device is used in vacuo in semiconductor producing machine, liquid crystal panel producing machine, etc., the vapor of the lubricant causes pollution in its working atmosphere.

Therefore, as the lubricant to be used in vacuo there has been used a lubricating oil having a low vapor pressure, a solid lubricant or the like. Examples of the solid lubricant employable herein include lamellar materials such as molybdenum disulfide, soft metal-based solid lubricants such as gold, silver and lead, and polymer-based solid lubricants such as polytetrafluoroethylene (PTFE).

However, the aforementioned electrically-conductive soft solid lubricants are disadvantageous in that they can produce an abrasion powder (particle) which are then attached to semiconductor pattern, causing short circuiting, when used in a rolling device operating in vacuo.

Further, the solid lubricant such as molybdenum disulfide and PTFE is disadvantageous in that it can difficultly be transferred to the sliding members and exhibits a deteriorated abrasion resistance that gives an insufficient durability.

The present applicant proposes a rolling device comprising a dense nitride layer formed thereon and having its track surface coated with a lubricant made of a fluorine-containing polymer having a functional group and a perfluoropolyether (PFPE) in Japanese Patent Laid-Open No. 2001-248708.

The present applicant also proposes a rolling device having its track surface coated with a lubricant comprising as a main component an alkylated cyclopentane having a vapor pressure of not higher than $10^{-11}$ Torr at 20° C. in Japanese Patent Laid-Open No. 2001-72987.

A rolling device having its track surface coated with such a lubricant generates a reduced amount of dust or causes little outgassing and exhibits a prolonged life as compared with rolling devices comprising a solid lubricant.

In a rolling device such as ball screw, a means has been proposed involving the disposition of a separator (retention peace) interposed between adjacent balls for the purpose of realizing noise reduction and life prolongation and the arrangement such that the separator moves with the rolling of the balls to prevent competition of the adjacent balls.

This separator has a columnar shape and a concave surface formed on both bottom surfaces thereof for retaining the ball. Further, the separator is formed by an unreinforced product of a resin composition or a product of such a resin composition containing a proper reinforcing material. As such a material constituting the resin composition there may be used a polyamide resin such as nylon 66.

In recent years, with the trend of enhancement of degree of integration and fineness of various devices such as semiconductor element, there has been an apprehension that fine particles and gases can be attached to the surface of semiconductor elements during production to have adverse effects on product performance, reliability and yield. It has thus been keenly desired to not only realize the prolongation of the life of the rolling device but also minimize the amount of particles or gases to be scattered or evaporated from the rolling device to the exterior thereof.

The aforementioned rolling device having its track surface coated with a lubricant generates a reduced amount of dust or causes little outgassing. However, since the rolling device is lubricated by a thin lubricant film, the life of the rolling device expires sometime when the lubricant film is lost. Therefore, in order to render the rolling device maintenance-free or prolong the maintenance-free life of the rolling device, some problems must be solved.

On the other hand, the rolling device having a separator incorporated therein is disadvantageous in that the polyamide resin which is used as a constituent of the separator absorbs water to release gas.

The polyamide resin which is used as a constituent of the separator is also disadvantageous in that when the rolling device is operated unlubricated or with a slight amount of a lubricant, the resin undergoes remarkable abrasion, causing the life of the rolling device to expire in a short period of time and the generation of abrasion powder that pollutes the external atmosphere of the rolling device.

SUMMARY OF THE INVENTION

An aim of the invention is therefore to provide a liner motion device which can maintain a low noise over an extended period of time.

The aforementioned aim of the invention is accomplished with a liner motion device according to the invention comprising a liner motion element fitted on a shaft which moves straight along the shaft, a plurality of balls which are retained in a rolling element groove formed on the inner side of the liner motion element and roll over between the rolling element groove and the shaft, a separator interposed between the rolling elements and a circulating path formed in the liner motion element through which the rolling elements are circulated from one end of the rolling element groove to the other, wherein the separator is a product of a synthetic resin containing a lubricating oil in an amount of 3 to 25% by volume.

An aim of the invention is to solve the problems with the rolling devices such as the aforementioned related art ball screw and provide a rolling device which generates a reduced amount of dust and exhibits an excellent durability even when used in vacuum atmosphere.

In order to solve the aforementioned problems, the invention has the following constitution. In other words, the rolling device of the invention comprises an outer member, an inner member, a plurality of rolling elements disposed between the outer member and the inner member, and a plurality of separators interposed between the adjacent rolling elements in the train of a plurality of rolling elements, wherein at least one of the raceway surface on the outer member, the raceway surface on the inner member, the rolling element and the spacer is coated with a lubricant containing a fluorine-containing polymer having a functional group and a perfluoropolyether (PFPE) to a thickness of 0.3 to 2 µm and the contiguous outer diameter of the both axial surfaces of the spacer in contact with the rolling element is smaller than the outer diameter of the spacer.

The rolling device having the aforementioned arrangement generates a reduced amount of dust and exhibits an excellent durability even when used in vacuum atmosphere. The rolling device of the invention is lubricated with a lubricant film containing a fluorine-containing polymer having a functional group and PFPE as a lubricant.

The aforementioned lubricant film is fluidic because it contains a fluorine-containing polymer having a functional group and PFPE. Accordingly, even in the case where a relatively great axial load is imposed, it is little likely that the lubricant film can be peeled off or fall off the members due to load developed by the rolling of the balls as in the related art coat film of solid lubricant. Thus, the resulting rolling device can generate a reduced amount of gust and can be used in semiconductor producing machine, etc. The rolling device of the invention has an excellent durability and a prolonged life.

The thickness of the lubricant film containing a fluorine-containing polymer having a functional group and PFPE is from 0.3 µm to 2 µm. When the thickness of the lubricant film falls below 0.3 µm, the resulting ball screw leaves something to be desired in durability. On the contrary, when the thickness of the lubricant film exceeds 2 µm, a problem arises that the generated amount of dust increases.

As mentioned above, the aforementioned lubricant film to be used in the rolling device of the invention contains a fluorine-containing polymer having a functional group and PFPE. The lubricant film may be formed by a mixture of the two components. Alternatively, the lubricant film may be a double-layer structure comprising a layer made of a fluorine-containing polymer having a functional group and a layer made of PFPE.

In the rolling device of the invention, the spacer to be interposed between the rolling elements comes in contact with the rolling element on the both axial surfaces thereof in an area having an outer diameter smaller than the outer diameter of the spacer. When the contiguous outer diameter of the both axial surfaces of the spacer in contact with the rolling element is equal to the outer diameter of the spacer, the lubricant film is scratched off by the corner of the spacer, reducing the life of the rolling device.

Under these circumstances, an aim of the invention is to provide a rolling device which be used in an atmosphere such as in semiconductor producing machine, liquid crystal panel producing machine and food processor requiring a clean atmosphere and in a high vacuum, at high temperatures, at a high operating speed or in a clean atmosphere with little dust generation and outgassing and an excellent torque life.

In order to accomplish the aforementioned aim, the invention lies in a rolling device comprising an outer member, an inner member, and a plurality of rolling elements rollably disposed between the outer member and the inner member, wherein at least one of the outer member, the inner member and the rolling elements is degreased and cleaned, heated on the surface thereof in an atmosphere of a halogen-based gas to undergo surface activation, and then coated, or sealed or covered with a lubricant.

The invention lies in a rolling device comprising an outer member, an inner member, and a plurality of rolling elements rollably disposed between the outer member and the inner member, wherein at least one of the outer member, the inner member and the rolling elements is degreased and cleaned, subjected to plasma surface treatment to undergo surface activation, and then coated, or sealed or covered with a lubricant.

The invention lies in the rolling device according to the above construction, wherein the surface-activated material is stainless steel and coated or sealed with a fluorine-based grease as the lubricant.

The invention lies in the rolling device according to the above construction, wherein the surface-activated material is stainless steel and covered with a fluorine oil having a vapor pressure of not greater than $10^{-8}$ Pa as the lubricant.

Japanese Patent Laid-Open No. 2001-254803 discloses a ball screw device comprising a lubricant film containing a fluorine-containing polymer having a functional group and PFPE. In order to improve the wetting properties of PFPE, a fluorine-containing polymer having a functional group is used. However, a fluorine-containing polymer having a functional group normally has a higher vapor pressure than PFPE and thus leaves something to be desired in outgassing resistance particularly as a lubricant for use in ultrahigh vacuum.

Accordingly, the invention involves the activation of the surface of the matrix with a halogen-based gas as a treatment prior to the coating with a fluorine oil to improve the wettability thereof by the fluorine oil rather than the use of a fluorine-containing polymer having a functional group, which leaves something to be desired in outgassing resistance.

The activation of the surface of the matrix can be accomplished by heating the surface of the matrix in a halogen-based gas or exposing the matrix to the halogen-based gas in plasma form. In this manner, the wettability of the matrix by PFPE can be sufficiently enhanced without adding a fluorine-containing polymer having a functional group.

The halogen-based gas for activating the surface of the matrix is not specifically limited but may be $NF_3$, $BF_3$, $CF_4$, $CCl_4$, $CBr_4$, $CI_4$, $CHF_3$, $CHCl_3$, $CHBr_3$, $CHI_3$, $SF_6$, $F_2$ or the like.

The plasma surface treatment of the present invention comprises exposing the object to be treated to plasma so that $O_2$ plasma is acted on an organic material physically or chemically adsorbed by the surface of the object to produce $CO$, $CO_2$ and $H_2O$ with which the surface of the object is then cleaned. This surface treatment can be effected in vacuo or in the atmosphere. However, when the object is stained with not only an organic material but also an inorganic material, the inorganic material cannot be removed by $O_2$ plasma.

In this case, plasma is produced in vacuo. The ions constituting the plasma are then accelerated in an ion sheath to cause the gas ion to hit the stain. Thus, the surface of the matrix can be physically cleaned.

Any plasma surface treatment can involve the use of atmosphere, oxygen, argon, halogen-based gas or mixture thereof.

When the matrix which has been heated on the surface thereon in the atmosphere of a halogen-based gas to undergo surface activation or subjected to plasma surface treatment to undergo surface activation is coated with a fluorine oil having a vapor pressure of not greater than $10^{-8}$ Pa or coated or sealed with a fluorine-based grease, the wettability of the matrix by the fluorine oil can be enhanced, reducing the generated amount of dust.

Further, since the bond strength of the fluorine oil to the matrix is enhanced, the linear guide device or ball screw device which makes stroke movement can difficultly have the lubricant to be removed from the track surface, making itself more lubricative and hence less subject to abnormal abrasion or seizing. Moreover, even when the internal clearance is reduced due to the generation of heat in the rolling device, the rolling device which is thus made more lubricative is less subject to abnormal abrasion or seizing.

The invention has been worked out under these circumstances. An aim of the invention is to provide a rolling device which can be provided with a prolonged life, rendered maintenance-free or provided with a prolonged maintenance-free life and causes minimized pollution in the external atmosphere and a separator for the rolling device.

In order to solve the aforementioned problems, the invention lies in a rolling device comprising an outer member, an inner member, a plurality of rolling elements rollably disposed between the outer member and the inner member, and a plurality of separators interposed between the plurality of rolling elements, wherein the separator is formed by a porous material.

In the rolling device of the invention, the porous material may be formed by a metal material.

Further, in the rolling device of the invention, the porous material may be a sinter of polyimide resin powder. In this case, the sinter of polyimide resin powder preferably has a volume porosity of 10 to 40%.

Further, in the rolling device of the invention, the porous material is preferably impregnated with a lubricant.

Further, in the rolling device of the invention, the lubricant may be a lubricating oil comprising a liquid fluorinated polymer oil or alkylated cyclopentane as a main component.

Further, in the rolling device of the invention, the lubricant may be a fluorine-based grease.

Further, in the rolling device of the invention, at least one of the outer member, the inner member and the rolling element is preferably formed by ceramics, hard alloy, stainless steel and cermet, singly or in combination of two or more thereof.

The invention also lies in a separator for rolling device to be interposed between a plurality of rolling elements constituting a rolling device which is made of a porous material formed by a metal material or a sinter of polyimide resin powder having a volume porosity of 10 to 40%.

In the separator for rolling device of the invention, the porous material is preferably impregnated with a lubricant.

Further, in the separator for rolling device of the invention, the lubricant may be a lubricating oil comprising a liquid fluorinated polymer oil or alkylated cyclopentane as a main component.

Further, in the separator for rolling device of the invention, the lubricant may be a fluorine-based grease.

In accordance with the rolling device of the invention, the separator is formed by a porous material. In this arrangement, the apparent density of the separator can be reduced to reduce the weight thereof while providing the separator with sufficient functions. Thus, the resulting separator can be provided with stable operating characteristics.

Further, since the separator formed by a porous material can effectively retain a lubricant in numerous pores present in the surface and interior thereof, the separator can be provided with an enhanced abrasion resistance and seizing resistance, making it possible to realize the prolongation of the life of the rolling device.

Further, a lubricant can be effectively retained in numerous pores present in the surface and interior of the separator, making it difficult for the lubricant to be scattered toward the exterior of the rolling device during the operation of the rolling device and hence making it possible to inhibit the pollution of the external atmosphere of the rolling device.

In particular, the porous material constituting the separator can be formed by a metal material, making it possible to further enhance the durability of the separator as well as inhibit the production of gas in the external atmosphere, which has been considered a problem with the related art separator made of polyamide resin.

Further, the porous material constituting the separator can be formed by a sinter of polyimide resin powder to further enhance the heat resistance thereof.

In accordance with the rolling device of the invention, the separator is impregnated with a lubricant. In this arrangement, even when a lubricant can be difficultly provided into the contact surface of the rolling element with the separator or the supply of a lubricant is temporarily suspended, the lubricant filled in the separator is transferred to the rolling element, making it possible to maintain stable operating characteristics. Accordingly, the abrasion resistance and seizing resistance of the rolling device can be further enhanced, making it possible to realize further prolongation of the life of the rolling device.

In particular, when as the lubricant there is used a lubricating oil comprising a liquid fluorinated polymer oil or alkylated cyclopentane as a main component, the desired lubricating effect can be exerted even if the lubricant is present in the form of single molecule film. Further, since such a lubricating oil has a low vapor pressure, it doesn't vaporize in a short time, making it possible to suppress outgassing.

Further, a lubricating oil comprising a liquid fluorinated polymer oil or alkylated cyclopentane as a main component has an excellent heat resistance and thus can be used without any problems in rolling devices which are more subject to frictional heating than rolling bearing such as ball screw and linear guide. The lubricating oil comprising an alkylated cyclopentane as a main component has a better lubricacity than the liquid fluorinated polymer oil and thus can realize further prolongation of the life of the rolling device.

In accordance with the rolling device of the invention, at least one of the outer member, the inner member and the rolling element can be formed by ceramics, hard alloy, stainless steel and cermet, singly or in combination of two or more thereof to drastically lessen the impact of these members against the separator, making it possible to secure stable operating characteristics and hence realize further prolongation of the life of the rolling device.

In accordance with the separator for rolling device of the invention, the rolling device of the invention can be easily realized.

DETAILED DESCRIPTION OF THE PREFERRED EMBODIMENTS

The liner motion device according to the invention will be further described hereinafter.

Figure 1:
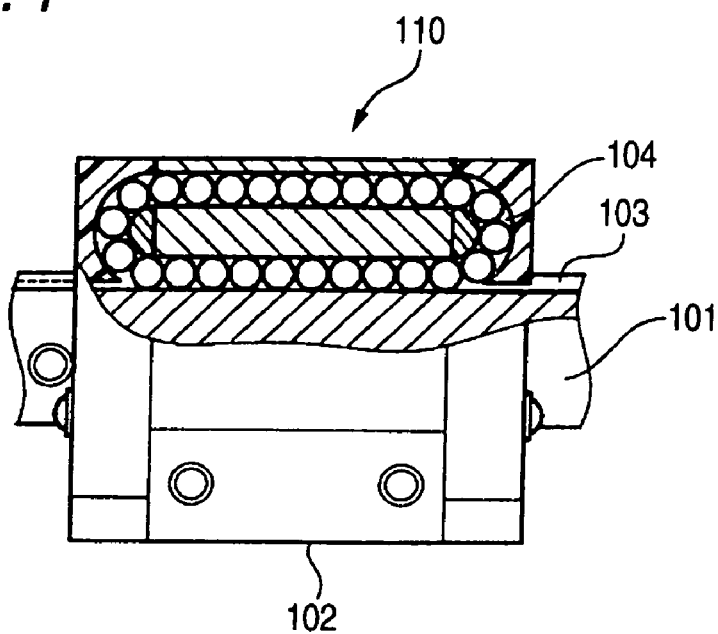
FIG. 1 is a partially cutaway plan view illustrating a linear guide device which is an embodiment of the liner motion device according to the invention.
Figure 2:
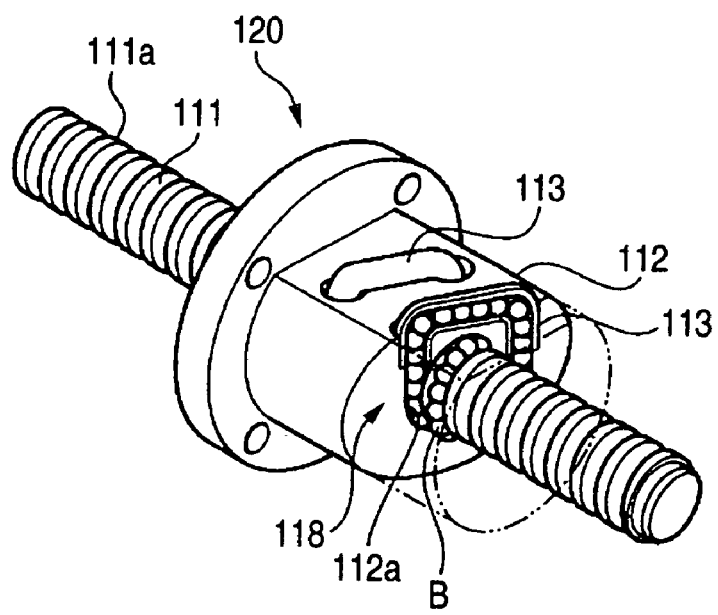
FIG. 2 is a partially cutaway perspective view illustrating a ball screw which is another embodiment of the liner motion device according to the invention.
Figure 3:
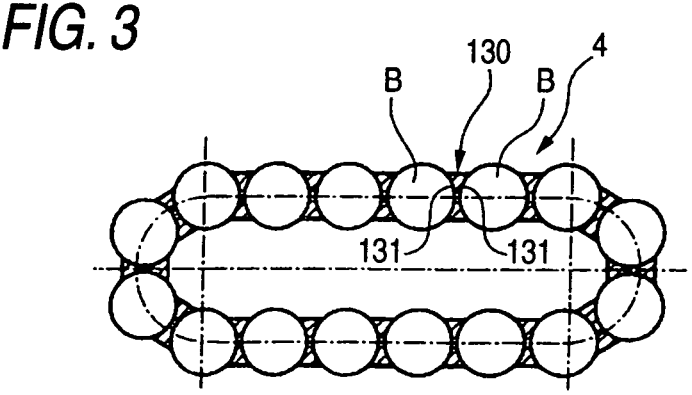
FIG. 3 is a plan view illustrating the interior of the ball circulating path of the linear guide device of FIG. 1.

In the invention, the liner motion device is not limited so far as it is provided with a separator. The linear guide device 110 as shown in FIG. 1 and the ball screw 120 as shown in FIG. 2 may be exemplified. Further, the separator 130 is a product of a lubricant-containing synthetic resin described in detail hereinafter.

As the synthetic resin which can contain a lubricant there may be used a thermoplastic resin such as polyacetal, polyamide 6, polyamide 66, polyamide 12, polybutylene terephthalate, polyethylene, polyphenylene sulfide and polyurethane elastomer. Preferred among these thermoplastic resins are polyacetal, polyamide 12, polybutylene terephthalate, polyethylene, polyphenylene sulfide and polyurethane elastomer taking into account the dimensional change due to water absorption. The polyamide 12 may be an elastomer comprising polyamide 12 as a hard segment and polyether as a soft segment. These synthetic resins may be used singly or in combination.

As the lubricating oil there is preferably used a mineral oil, ester oil, silicone oil or the like. The content of such a lubricating oil is adjusted to be from 3 to 25% by volume of the total amount of the lubricant-containing synthetic resin. When the content of the lubricating oil falls below 3% by volume, little or no effect of improving lubricity can be exerted to disadvantage. On the contrary, when the content of the lubricating oil exceeds 25% by volume, the resulting separator exhibits an insufficient strength and thus can easily break when it comes in contact with the balls during the running of the liner motion device.

In order to incorporate the lubricant in the synthetic resin, a method is preferably used which comprises uniformly dispersing a powder of oil-retaining material containing a lubricant in the synthetic resin. As the oil-retaining material there may be used a powder of activated charcoal, vermiculite (see Japanese Patent Publication No. 04-51581), ultra-high molecular polyethylene, polyvinyl chloride, polyurethane, silicone or the like. The oil-retaining material to be used herein may be properly selected depending on the kind of the synthetic resin or lubricating oil. A synthetic resin having a high oil absorption such as polyethylene can directly be contacted by the lubricant without using any oil-retaining material.

The aforementioned lubricant-containing synthetic resin may comprise a reinforcing filler such as glass fiber, carbon fiber and potassium titanate whisker incorporated therein as necessary. The incorporation of such a filler gives enhancement of the strength, abrasion resistance and impact resistance of the separator, making it possible to prevent damage due to collision with the balls, etc. and maintain low noise level over an extended period of time. Particularly preferred among these fillers are carbon fiber and potassium titanate whisker, which themselves have vibration-damping properties. The amount of such a filler to be incorporated is preferably from 10 to 40% by weight, particularly from 20 to 30% by weight based on the total weight of the separator.

When the amount of such a filler to be incorporated falls below 10% by weight, the resulting effect of enhancing the strength and other properties of the separator is insufficient. On the contrary, when the amount of such a filler to be incorporated exceeds 40% by weight, the resulting resin composition exhibits a deteriorated formability to disadvantage.

The aforementioned filler may be partly replaced by a solid lubricant, making it possible to lower the static friction coefficient of the resulting separator. As the solid lubricant there may be used a known solid lubricant such as $MOS_2$, $WS_2$, graphite and PTFE.

The resin composition may further comprise an oxidation inhibitor such as phenolic oxidation inhibitor and amine-based oxidation inhibitor incorporated therein to prevent thermal deterioration thereof.

In order to obtain the desired separator, the aforementioned lubricant-containing synthetic resin as a forming material is formed into a desired shape preferably by injection molding. The separator thus obtained has an extremely small amount of the lubricating oil present on the surface thereof. The lubricating oil lowers the dynamic friction coefficient of the separator. The lubricating oil also oozes gradually to the surface of the separator to render the separator lubricating over an extended period of time. Table 1 below shows the dynamic friction coefficient of samples obtained by incorporating a lubricating oil (mineral oil) in a polyacetal (POM) or a polybutylene terephthalate (PBT) in various amounts to prepare lubricant-containing synthetic resins, and then forming the synthetic resin. For the measurement of the dynamic friction coefficient, a Suzuki-Matsubara process thrust abrasion friction testing machine was used. The mating member used was S45C (diameter of 9.6 to 11.6). The measurement was effected at a load of 4.4 MPa, a rate of 18.2 m/min and a surface roughness of 3 S for 10 minutes.

Figure 5A:
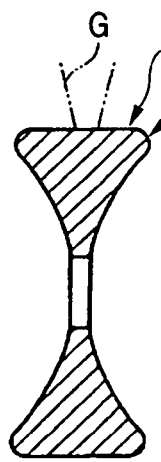
FIGS. 5A and 5B are a sectional view and a front view illustrating another preferred example of the separator of the invention, respectively.
Figure 5B:
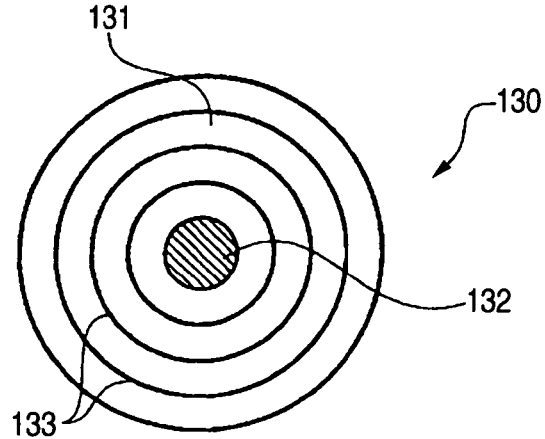

The separator 130 may further have a concentric or spiral groove formed on the concave surface 131 thereof. The separator 130 may further be pierced with a hole so that the grease can easily flow into the gap between the concave surface 131 of the separator 130 and the ball B. For example, the separator 130 shown in FIGS. 5A and 5B are pierced with a hole 132 at the central part of the concave surface 131. A plurality of grooves 133 are formed concentrically. The grease (not shown) which has flown through the hole 132 is then retained in the groove 103 to keep the ball fairly lubricated. The peripheral edge 130a of the concave surface 131 is chamfered circularly to make it more easily for the grease to flow into the gap. The diameter of the hole 132, the depth, width and number of grooves 133, etc. are not limited but may be properly predetermined depending on the size, mechanical strength, etc. of the separator 130. For example, the depth of the groove 103 is preferably from about 5 µm to 30 µm.

A plurality of combinations of the roughening of the concave surface 131, the formation of the hole 132 and the groove 103 and the chamfering of the peripheral edge 130a of the concave surface 131 may be used.

The gate of the injection molding machine to be used herein may be in the form of pin. The position of the gate is preferably deviated from the concave surface 131 of the separator. For example, as shown in FIG. 5A, the gate G is preferably arranged such that it faces the peripheral surface of the separator 130. Alternatively, though not shown, the gate may be arranged such that it faces the inner surface of the hole 132.

The aforementioned separator 130 is interposed between the balls B of a linear guide device 110 as shown in FIG. 1 or a ball screw device 120 as shown in FIG. 2. A lubricating grease is then sealed in the ball circulating paths 113, 118 to complete the liner motion device of the invention. The filling

TABLE 1

Measurements of dynamic friction coefficient

| | POM (containing 5 vol-% of oil) | POM (containing 10 vol-% of oil) | POM (containing 15 vol-% of oil) | POM (free of oil) | POM (containing 5 vol-% of oil) | POM (free of oil) |
|---|---|---|---|---|---|---|
| Dynamic friction coefficient | 0.20 | 0.15 | 0.10 | 0.25 | 0.24 | 0.49 |

As can be seen in Table 1, the incorporation of a lubricating oil causes the drop of the dynamic friction coefficient of both the synthetic resins. Further, as the content of the lubricating oil increases, the drop of the dynamic friction coefficient increases.

Figure 4:
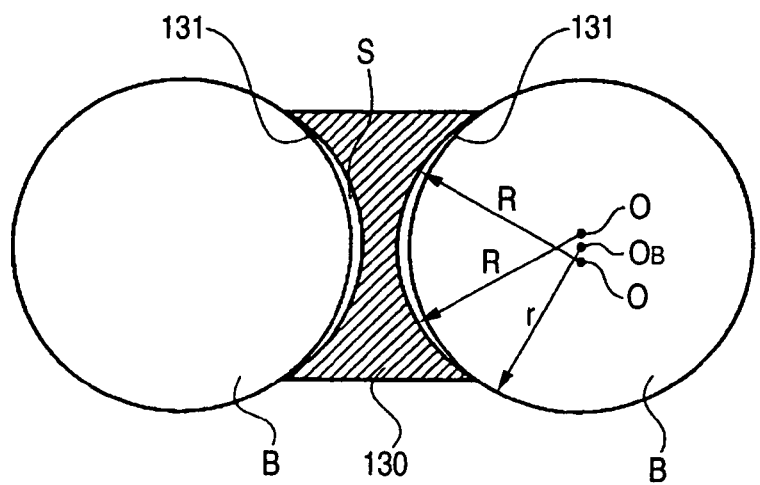
FIG. 4 is a sectional view illustrating a preferred example of the separator of the invention.

The shape of the separator may be the same as ever. For example, the shape shown in FIG. 4 is desirable. The separator 130 shown has two centers of radius of curvature R forming the concave surface 131 which each deviate from the center $O_B$ of the ball B. In this arrangement, a gap S is formed between the concave surface 131 of the separator 130 and the ball B. A grease (not shown) flows into the gap S to allow the ball B to roll over smoothly. The surface of the concave surface 131 may be flat but is preferably rough to retain the grease thereon. The degree of roughness of the concave surface 131 is preferably from 5 µm to 50 µm as calculated in terms of surface roughness $R_{max}$.

grease to be used herein may be a known material but may be a mineral oil-lithium soap-based grease or the like.

While the aforementioned embodiment has been described with reference to the case where as the rolling element there is used a ball, a roller may be used instead of ball.

EXAMPLE

The invention will be further described in the following examples and comparative examples.

(Preparation of Separator)

A polyamide 12 containing a lubricating oil (mineral oil) in an amount of 5% by volume (Ganpla Grade N12-L, produced by Sumitomo Electric Industries, Ltd.) was subjected to injection molding to prepare a separator A (inventive) pierced with a hole and provided with a concentric groove having a depth of 30 μm as shown in FIGS. 5A and 5B. For comparison, a polyamide 66 (Unreinforced Ultramit A, produced by BASF Japan Co., Ltd.) was used to prepare a separator B (comparative) having the same shape as that of the separator A.

(Test on Operating Characteristics)

As a testing linear guide device there was used a linear guide device ("LH30", produced by NSK Ltd.). The separator A was then interposed between the balls such that the sum of all the gaps between the ball and the separator was 50% of the ball diameter. The ball circulating path was then fully filled with a mineral oil-lithium soap-based alvania No. 2 grease. Under these conditions, the linear guide device was operated at a feed rate of 1 m/s. The resulting dynamic frictional force was measured. Separately, the ball circulating path was filled with the grease by 1%. Under these conditions, the dynamic frictional force was measured.

Similarly, the separator B was interposed between the balls. The ball circulating path was then fully filled with the grease. Under these conditions, the dynamic frictional force was measured. Separately, the ball circulating path was filled with the grease by 1%. Under these conditions, the dynamic frictional force was measured.

The measurements of dynamic frictional force developed when the ball circulating path was filled with the grease by 1% are set forth in Table 2 below relative to that developed when the ball circulating path was fully filled with the grease as 1. While the inventive separator made of a lubricant-containing polyamide showed a small rise of dynamic frictional force even when the amount of the grease was reduced, the comparative separator made of a lubricant-free polyamide showed a great rise of dynamic frictional force when the amount of the grease was reduced.

TABLE 2

Measurements of dynamic frictional force (relative to the value developed at full filling as 1)

| | Separator | Fully filled | Filled by 1% |
|---|---|---|---|
| Example 1 | Separator A | 1.0 | 1.05 |
| Comparative Example 1 | Separator B | 1.0 | 1.30 |

The rolling device of the invention will be further described in connection with the attached drawings.

Figure 6:
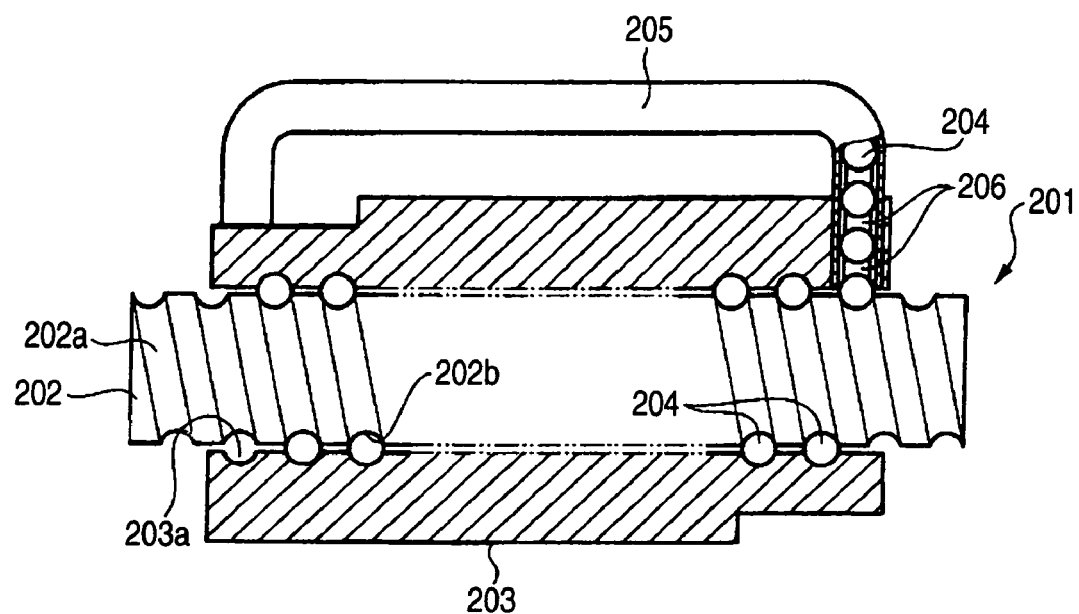
FIG. 6 is a sectional view illustrating an embodiment of the ball screw according to the invention.

Taking a ball screw, which is one of the rolling devices according to the invention, as an example, an embodiment of implementation of the invention will be described in detail in connection with the attached drawings. The invention is not limited to the present embodiment. FIG. 6 is a schematic sectional view of a ball screw 201 illustrating a ball nut 203 and a circulator tube 205 with the latter shown partly broken.

As shown in FIG. 6, the ball screw 201 comprises a thread 202 having a spiral thread groove 202a formed on the outer surface thereof, a ball nut 203 having a spiral thread groove 203a formed on the inner surface thereof opposed to the thread groove 202a of thread 202 and engaged with the thread 202 with the interposition of a plurality of balls 204 (shown only partly) rollably fitted in a spiral ball rolling space defined by the thread groove 202a of the thread 202 and the thread groove 203a of the ball nut 203 and having a spacer 206 interposed therebetween, and a circulator tube 205 (ball circulating path).

The circulator tube 205 is adapted to allow the balls 204 to roll in circulation with the spacer 206 when any one of the thread 202 and the ball screw nut 203 is rotated. The circulator tube 205 is mounted on the ball screw nut 203. In this arrangement, the balls 204 which roll through the ball rolling space make a repeated circulation. In some detail, the balls 204 run around the thread 202 plural times in the ball rolling space with the spacer 206. The balls 204 are then caught by one end of the circulator tube 205 from which they then pass through the circulator tube 205. The balls 204 are then returned to the ball rolling space from the other end of the circulator tube 205.

The sectional shape of the thread grooves 202a, 203a may be properly selected. It may be a Gothic arch, i.e., V-form comprising in combination two arcs having different centers of curvature, or an arc.

Figure 7:
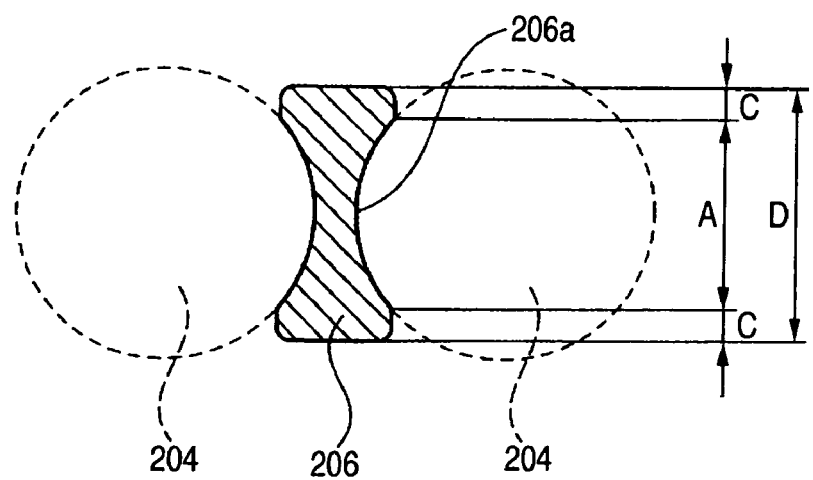
FIG. 7 is a sectional view illustrating a spacer in the ball screw according to the invention.

As shown by a sectional view in FIG. 7, the spacer 206 is arranged such that the outer diameter A of a contact surface 206a provided on both axial surfaces thereof in contact with the ball 204 is smaller than the outer diameter D of the spacer 206. The shape of the portion outside the contact area 206a of the spacer 206, i.e., portion C may be properly predetermined as necessary. The difference between the outer diameter A of the contact area and the outer diameter D of the spacer may be properly predetermined as necessary, but the ratio of outer diameter A of contact area to outer diameter D of spacer is preferably from 0.2 to 0.9.

The aforementioned thread 202, ball screw nut 203, ball 204, circulator tube 205 and spacer 206 are normally formed by a corrosion-resistant material. Examples of the material of the thread 202 and ball screw nut 203 include those obtained by hardening JIS SUS440C, steel containing 0.65% of carbon and 13.0% of chromium as alloying components and martensite-based stainless steel containing 0.45% of carbon, 13.0% of chromium and 0.14% of nitrogen as alloying components, and precipitation hardening stainless steel SUS630.

The material of the ball 204 may be cermet such as ceramics and hard alloy besides steel material as mentioned above. As the ceramics material there may be used one mainly composed of alumina ($Al_2O_3$), silicon carbide (SiC) and zirconia ($ZrO_2$) besides one mainly composed of silicon nitride ($Si_3N_4$). The material of the circulator tube 205 may be an austenite-based stainless steel such as SUS304.

Examples of the material of the spacer 206 include resin materials such as polyimide, polytetrafluoroethylene, polyamideimide and polyether ether ketone, base metal such as aluminum, copper and magnesium, and stainless steel such as SUS304 and SUS316. The separators to be interposed between the balls may be separated or connected. The shape and size of the spacer are not specifically limited so far as the spacer can be disposed in the ball rolling space defined by the thread groove of the thread and the thread groove of the ball screw nut and can be stably interposed between the balls under the conditions that the aforementioned relationship between the outer diameter A of contact area and the outer diameter D of spacer is satisfied. The spacer may be formed by a porous material which is then impregnated with a lubricant.

The ball screw 201 has a lubricant film (not shown) made of a mixture of a fluorine-containing polymer having a functional group and PFPE described later formed on the outer surface of the thread 202 including a track 202b, the inner surface of the ball screw nut 203 including a track 203b, the surface of the rolling elements 204, the inner surface of the circulator tube 205 and the surface of the spacer 206.

Preferred examples of the fluorine-containing polymer having a functional group employable herein include fluoropolyether polymer, and polyfluoroalkyl polymer. Examples of the fluoropolyether polymer include polymers each having a number-average molecular weight of 1,000 to 50,000 and repeating units represented by the following chemical formula (1). The fluoropolyether polymer has the same functional group as in the polyfluoroalkyl polymer described later at least at one molecular end thereof. Chemical Formula (1)

$$—C_xF_{2x}—O— \quad (1)$$

wherein X represents an integer of 1 to 4.

Examples of the polyfluoroalkyl polymer include those represented by the following general formulae. In these general formulae, Y represents a functional group having affinity for metal such as epoxy group, amino group, carboxyl group, hydroxyl group, mercapto group, isocyanate group, sulfone group and ester group.

Chemical Formula

$CF_3(CF_2)_7$—Y, $H(CF_2)_6$—Y, $CF_2Cl(CF_2)_{11}$—Y, $CF_3CF_3CF(_7$—Y, $CF_2ClCF_3CF(CF_2)_7$—Y

Other examples of the polyfluoroalkyl polymer employable herein include those represented by the following general formulae. In these general formulae, l, m and n each represent an integer.

The fluorine-containing polymers exemplified above may be used singly or in combination of two or more thereof. In the case where two or more of these fluorine-containing polymers are used in combination, these fluorine-containing polymers (functional groups) are preferably used in proper combination such that these functional groups are reacted to raise the molecular weight of the fluorine-containing polymer. When the molecular weight of the fluorine-containing polymer is further raised, a lubricant film having a better abrasion resistance can be obtained.

Specific examples of the fluorine-containing polymer having a functional group employable herein include Krytox 157FSL, 157FSM and 157FSH (produced by Du Pont Inc.), modified DEMNUM SA, SH, SY-3 and SP (produced by DAIKIN INDUSTRIES, LTD.), and FOMBLIN Z DEAL, Z DIAC, Z DISCO, Z DOL, Z DOL and Z DOL TX2000 (produced by Montecatini Inc.).

The perfluoropolyether (PFPE) employable herein may be properly selected from products which have heretofore been commercially available. Specific examples of these commercially available products include S-200 and S-100 (produced by DAIKIN INDUSTRIES, LTD.), and 40/11 and Krytox 16140 (produced by FOMBLIN Inc.).

An example of the method for forming the lubricant film will be described hereinafter. For example, as PFPE there Chemical Formula

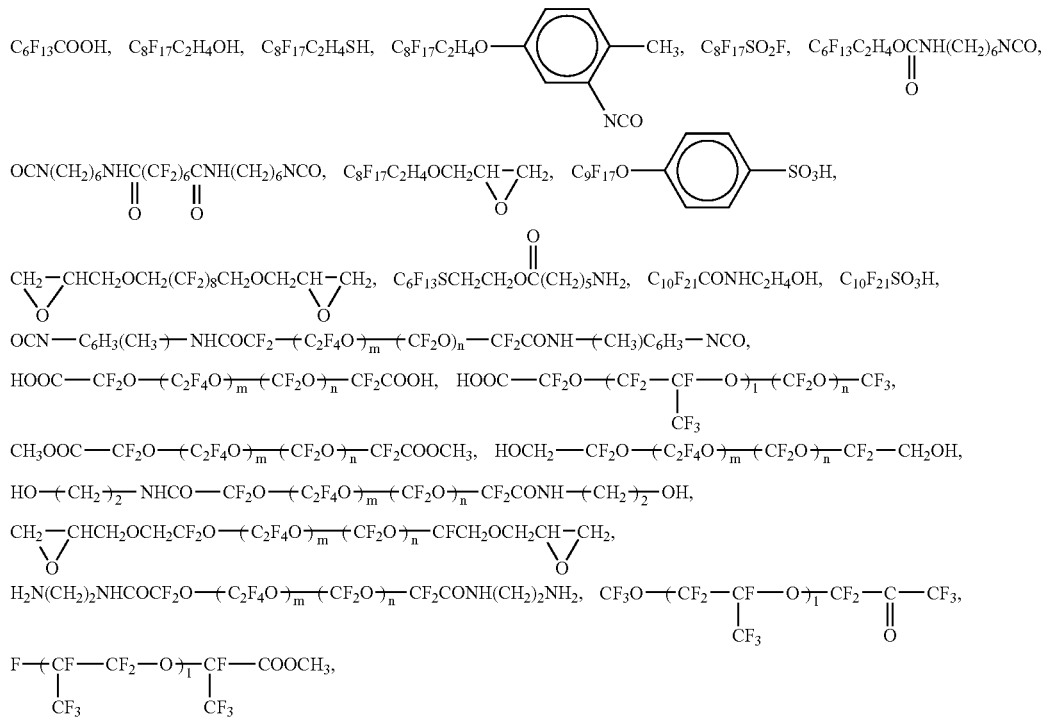

The aforementioned functional group is bonded to the metal constituting the thread 202 and the ball screw nut 203 when the lubricant film is applied to the surface of the thread 202 and the ball screw nut 203. The resulting lubricant film is firmly bonded to the surface of the thread 202 and the ball screw nut 203. In the case of a fluorine-containing polymer having a plurality of functional groups per molecule, at least one of these functional groups may be bonded to the metal.

may be used S-200 (produced by DAIKIN INDUSTRIES, LTD.). To PFPE is then added Krytox 157FSH (produced by Du Pont Inc.) as a fluorine-containing polymer having a functional group in an amount of 5%. The mixture is then diluted with a fluorine-based solvent (e.g., AK225, produced by ASAHI CHEMICAL INDUSTRY CO., LTD.) to a concentration of 2%. The composition thus obtained can be used as a coating lubricating oil. The ball screw 201 coated with such a lubricating oil is entirely dried at ordinary temperature, and then subjected to heat treatment at a temperature of 100° C. to 200° C. in a constant temperature bath or the like for 30 minutes.

The aforementioned process for providing a lubricant film may be repeated several times as necessary until a lubricant film is eventually formed to a thickness of 0.3 μm to 2 μm. The thickness of the lubricant film can be controlled by the concentration of the fluorine-containing polymer having a functional group and PFPE dissolved in the fluorine-based solvent. In this manner, a lubricant film can be formed on the rolling and sliding sites of the various elements constituting the ball screw 201 (thread 202, ball screw nut 203, ball 204, circulator tube 205, spacer 206) to a desired thickness.

The rolling device of the invention is not limited to ball screw but may be a liner guide rolling device such as linear guide and ball spline. It is essential that the invention be applied to devices which utilize the rolling of a train of rolling elements to make straight movement. The same effect of improving performance can be exerted.

EXAMPLE

The invention will be further described in the following examples and comparative examples, but the invention is not limited thereto.

Examples 2–5 and Comparative Examples 2–6

The results of the test of durability and generated amount of dust (out particle) on the aforementioned ball screw in vacuo with the kind of the lubricant, the thickness of the lubricant film and the spacer varying will be described hereinafter.

Figure 8:
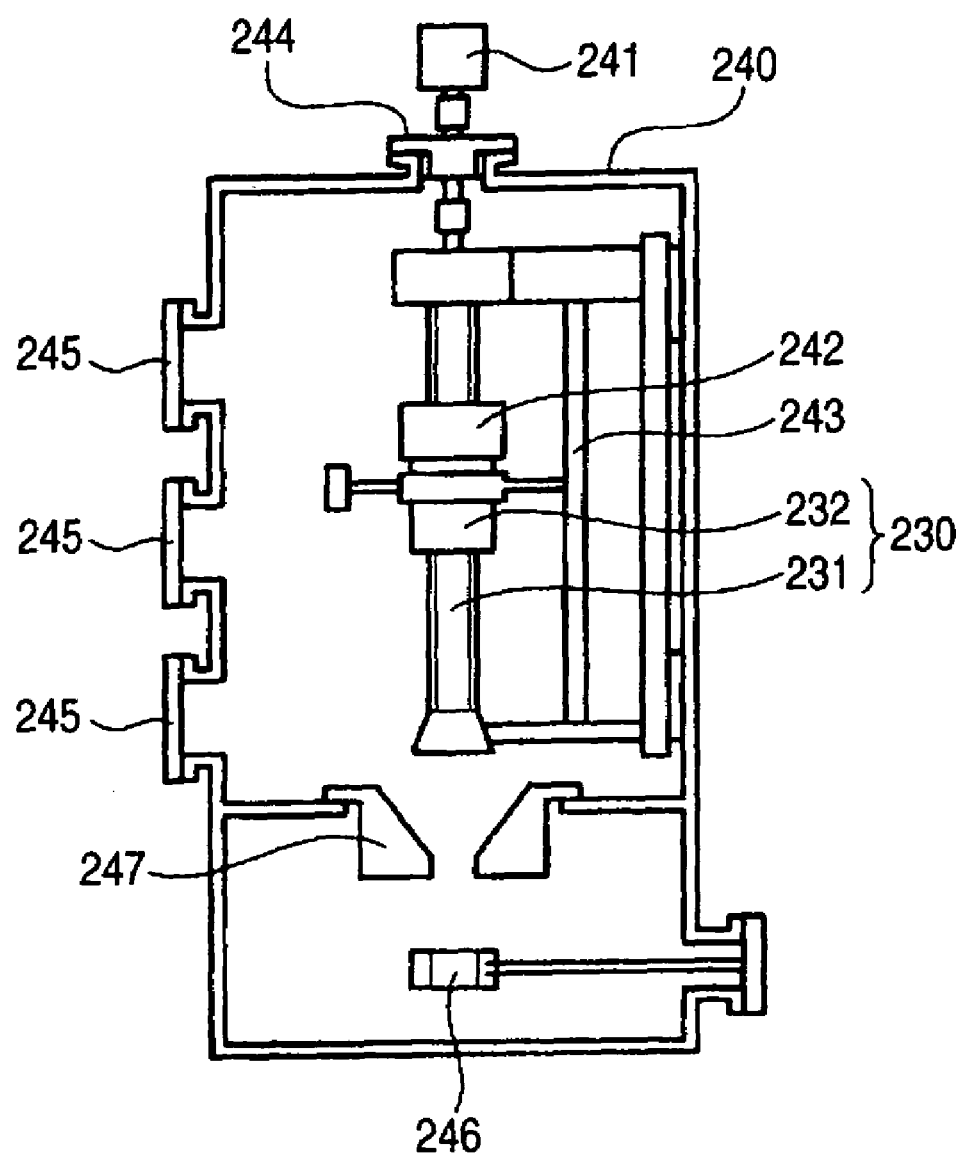
FIG. 8 is a schematic diagram illustrating a device used in the durability and dust generating tests in the examples.

For the test of durability and generated amount of dust, the device shown in FIG. 8 was used. In some detail, a ball screw 230 mounted in a vacuum tank 240 was rotated by an AC servo motor 241. The total number of rotations which have been made until the torque is raised is defined to be the life of the ball screw 230. When the number of rotations reached $10^6$, the generated amount of dust was measured. In FIG. 8, the reference numeral 231 indicates the thread of the ball screw 230, the reference numeral 232 indicates the ball screw nut of the ball screw 230, the reference numeral 242 indicates a weight which gives an axial load, the reference numeral 243 indicates a rotation stop for the ball screw nut 232, the reference numeral 244 indicates a magnetic fluid seal unit, the reference numeral 245 indicates a window for observation of the interior of the vacuum tank 240, the reference numeral 246 indicates a laser process particle counter, and the reference numeral 247 indicates a dust-collecting funnel.

The test conditions were as follows. Testing ball screws were prepared with the kind of lubricant, the thickness of film and the ratio of outer diameter of contact area varying as set forth in Table 2.
Ball screw: thread diameter: 15 mm; lead: 10 mm
Material of ball screw: Thread, ball screw nut, ball: SUS440C
　Circulator tube: SUS304
　Spacer: separating spacer made of polyimide
Roughness of groove on thread and nut: 0.05 μm
Rotary speed: 1,000 rpm
Load: axial load (Fa): 120 N
Stroke: 120 mm
Atmosphere: vacuum ($10^{-4}$ Pa or less)
Ambient temperature: room temperature

[Lubricant]
PFPE: S-200, produced by DAIKIN INDUSTRIES, LTD.
FSH: Krytox 157FSH (functional group: carboxyl group), produced by Du Pont Inc.
Z DIAC: FOMBLIN Z DIAC (functional group: carboxyl group), produced by Ausimont Inc.

Preparation: As a lubricant there was used one obtained by adding FSH or Z DIAC to PFPE S-200 in an amount of 5%, and then dissolving the mixture in a fluorine-based solvent AK225 to a concentration of 2%. The lubricant thus obtained was applied to all the parts of the ball screw, and then dried and heated at a temperature of 150° C. for 30 minutes.

[Contact Outer Diameter Ratio]
Contact outer diameter ratio=ratio of outer diameter of contact area of spacer with rolling element to outer diameter of spacer.

The measurements of life and generated amount of dust are set forth in Table 2 relative to the value of Comparative Example 2 as 1.

TABLE 2

| | Lubricant | Film thickness (μm) | Contact outer diameter ratio | Life ratio | Ratio of generated amount of dust |
|---|---|---|---|---|---|
| Example 2 | FSH + PFPE | 0.3 | 0.7 | 2.5 | 0.5 |
| Example 3 | Z DIAC + PFPE | 2.0 | 0.7 | 2.8 | 0.9 |
| Example 4 | FSH + PFPE | 1.0 | 0.9 | 2.0 | 0.6 |
| Example 5 | FSH + PFPE | 1.0 | 0.2 | 2.3 | 0.5 |
| Comparative Example 2 | FSH + PFPE | 1.0 | No spacer | 1 | 1 |
| Comparative Example 3 | PFPE | 1.0 | 0.7 | 0.4 | 0.8 |
| Comparative Example 4 | FSH + PFPE | 0.2 | 0.7 | 0.5 | 0.4 |
| Comparative Example 5 | FSH + PFPE | 2.2 | 0.7 | 3.1 | 1.8 |
| Comparative Example 6 | FSH + PFPE | 1.0 | 1 | 0.4 | 1.7 |

As can be seen in Table 2, the inventive testing ball screws of Examples 2 to 5 exhibit an excellent life and generate a reduced amount of dust. On the contrary, the testing ball screw free of spacer (Comparative Example 2) and the testing ball screw comprising a lubricant containing PFPE alone (Comparative Example 3) exhibit a deteriorated life as compared with Examples 2 to 5. The testing ball screw having an insufficient thickness of lubricant film (Comparative Example 4), too, exhibits a deteriorated life. The testing ball screw having an excessive thickness of lubricant film (Comparative Example 5) exhibits an excellent life but generates a raised amount of dust. The testing ball screw comprising a spacer having a contact area with the same outer diameter as that of the spacer (Comparative Example 6) is subject to peeling of lubricant film and thus exhibits a deteriorated life.

Figure 9:
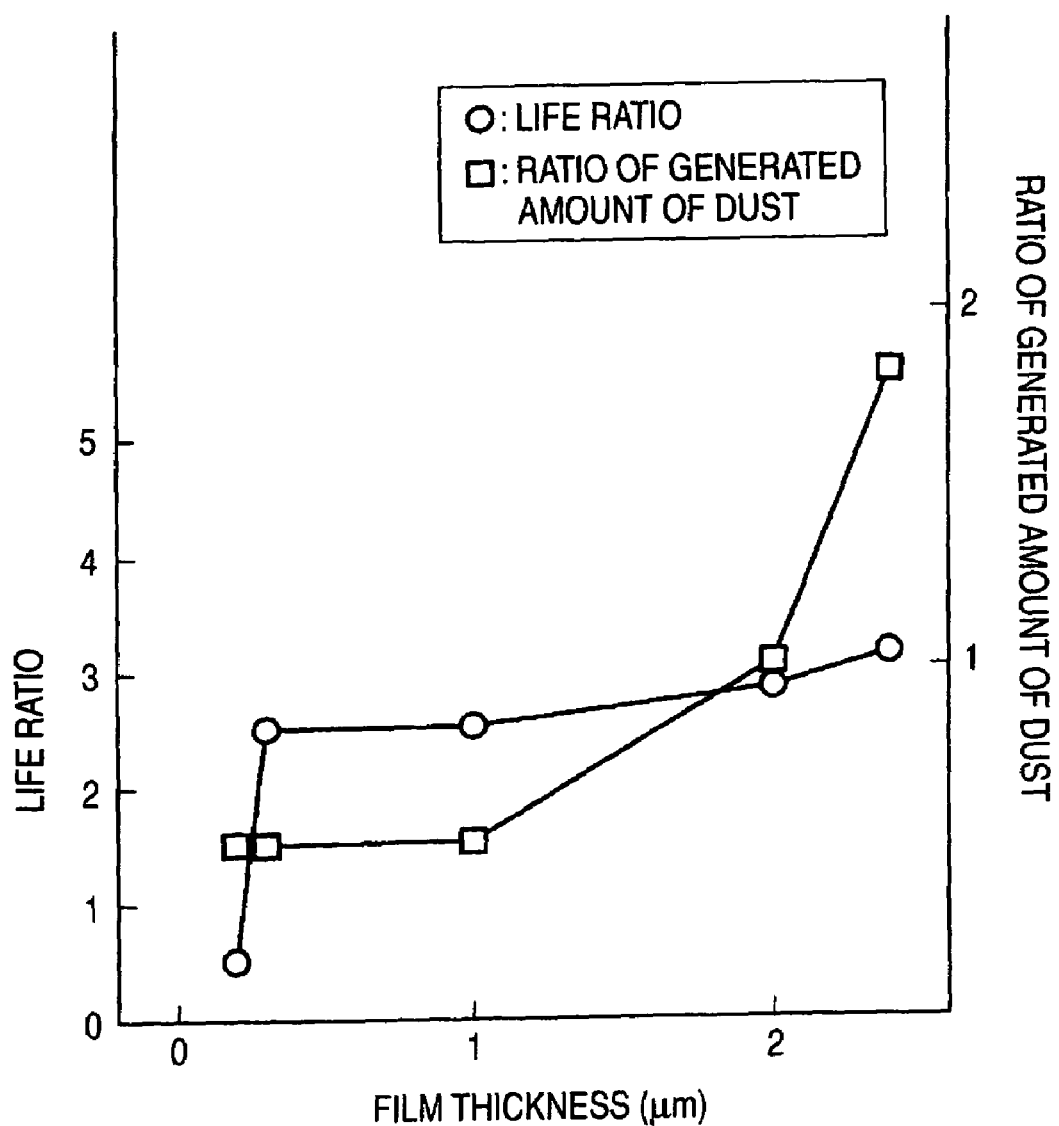
FIG. 9 is a graph illustrating the relationship between the thickness of lubricant film and the life ratio and ratio of generated amount of dust obtained in the examples.

The dust generation test and durability test were similarly conducted with the thickness of the lubricant film varying under the condition that the lubricant comprises FSH and PFPE and the contact outer diameter ratio is 0.7. The results are graphically shown in FIG. 9. In FIG. 9, circle indicates life ratio and square indicates ratio of generated amount of dust.

As can be seen in FIG. 9, the thickness of the lubricant film is preferably from 0.3 μm to 2 μm.

Figure 10:
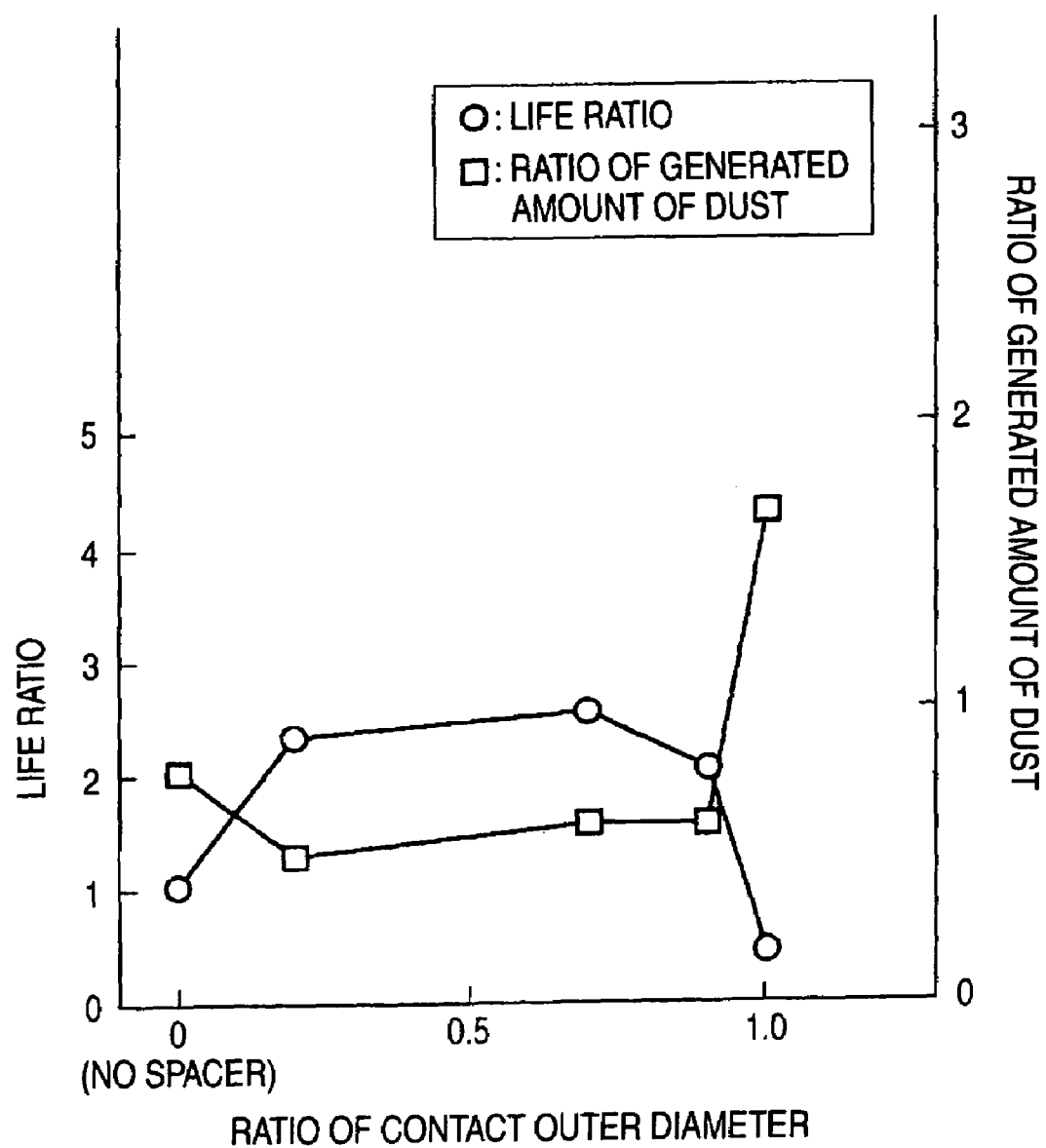
FIG. 10 is a graph illustrating the relationship between the contact outer diameter ratio and the life ratio and ratio of generated amount of dust obtained in the examples.

The dust generation test and durability test were similarly conducted with the contact outer diameter ratio varying under the condition that the lubricant comprises FSH and PFPE and the thickness of the lubricant film is 1.0. The results are graphically shown in FIG. 10. In FIG. 10, circle indicates life ratio and square indicates ratio of generated amount of dust.

As can be seen in FIG. 10, the contact outer diameter ratio is preferably from 0.2 to 0.9.

Embodiments of implementation of the invention will be described in connection with the attached drawings.

(Embodiment)

Figure 11:
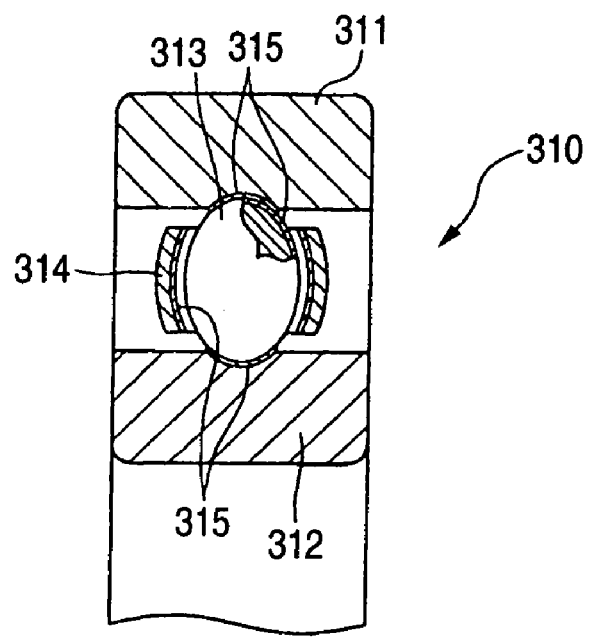
FIG. 11 is a sectional view illustrating a rolling device according to the first embodiment of implementation of the invention with the ball in a rolling bearing coated with a filmy lubricant shown partially broken.

FIG. 11 is a sectional view of a rolling bearing (rolling device) 310 coated with a filmy lubricant with a ball 313 as a rolling element sown partially broken. The rolling bearing 310 (nominal count: 608, produced by NSK Ltd.) comprises an outer ring (outer member) 311, an inner ring (inner member) 312, balls 313, and a retainer 314. The contact area (track surface) of the outer ring 311 with the ball 313, the contact area (track surface) of the inner ring 312 with the ball 313, the rolling surface of the ball 313 and the contact area of the retainer 314 with the ball 313 are degreased/cleaned, surface-activated, and then coated with a fluorine oil film to a thickness of 0.3 µm. Alternatively, these contact areas are degreased/cleaned, subjected to treatment in an atmospheric plasma treatment (produced by Yamato Glass Co., Ltd.) for about 10 seconds, and then assembled into a bearing which is then sealed with a fluorine-based grease.

Examples of the material of the inner ring 312, the outer ring 311 and the ball 313 include those obtained by hardening JIS SUS440C, steel containing 0.65% of carbon and 13.0% of chromium as alloying components and martensite-based stainless steel containing 0.45% of carbon, 13.0% of chromium and 0.14% of nitrogen as alloying components, and those obtained by nitriding precipitation hardening stainless steel SUS630 and austenite-based stainless steel. As the material of the ball 313 there may be used cermet such as ceramics material and hard alloy besides the same steel material as mentioned above. As the ceramics material there is used one mainly composed of alumina ($Al_2O_3$), silicon carbide (SiC), zirconia ($ZrO_2$) or the like besides those mainly composed of silicon nitride ($Si_3N_4$).

The fluorine oil layer 315 was formed by dipping the member in a solution obtained by diluting PFPE having a vapor pressure of not greater than $10^{-8}$ Pa at 20° C. such as S-200 (produced by DAIKIN INDUSTRIES, LTD.), FOMBLIN YHVAC 140/13, Z25 and Z60 (produced by Ausimont K.K.) and Krytox 143AC and 143AD (trade name, produced by Du Pont Inc.) with an organic solvent (e.g., AK-225) or applying the solution to the rolling surface. The member thus coated with the solution was dried at ordinary temperature, and then subjected to heat treatment at a temperature of 100° C. to 200° C. in a constant temperature tank for 30 minutes to 1 hour.

The thickness of the fluorine oil layer 315 can be controlled by the concentration of the fluorine oil dissolved in the organic solvent. The thickness of the fluorine oil layer 315 can be detected by an infrared spectrophotometric analyzer using a calibration curve which has been previously prepared. The method for applying the lubricant is not specifically limited. The amount of the fluorine-based grease to be filled in the rolling device is not specifically limited but is preferably as small as possible from the standpoint of outgassing or dust generation.

(Embodiment)

Figure 12:
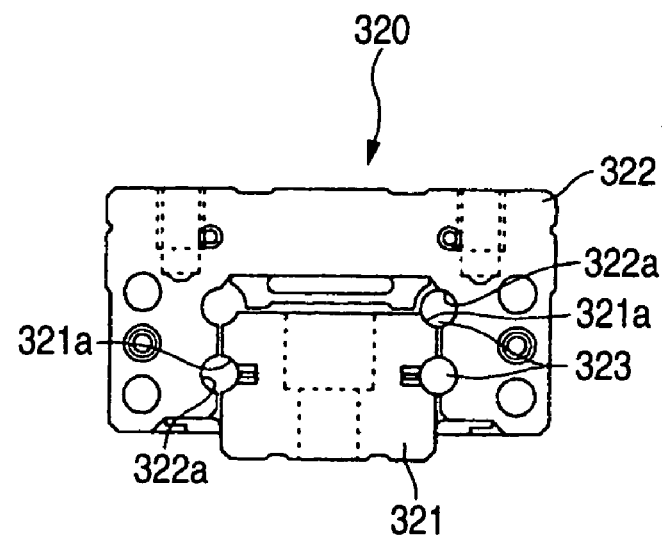
FIG. 12 is a front view illustrating a rolling device according to the second embodiment of implementation of the invention comprising a linear guide device coated with a filmy lubricant or a fluorine-based grease with its end cap not shown.

FIG. 12 is a front view of a linear guide device (rolling device) 320 coated with a filmy lubricant or a fluorine-based grease with its end cap not shown. The linear guide device 320 (nominal count: LS20AL, produced by NSK Ltd.) comprises a rectangular guide rail (inner member) 321 having an axial rolling element rolling groove 321a having an arc section formed on the both sides thereof and a slider (outer member) 322 having a U-shaped section disposed across the guide rail 321 in such an arrangement that it moves axially relative to the guide rail 321.

The slider 322 has a rolling element rolling groove 322a having an arc section formed on both inner surfaces thereof opposed to the rolling element rolling groove 321a of the guide rail 321. A linear ball rolling space having a substantially circular section defined by the rolling element rolling groove 321a of the guide rail 321 and the rolling element rolling groove 322a of the slider 322 has a plurality of balls 323 (shown only partly) as rolling elements filled rollably therein. The contact area of the rolling element rolling groove 321a of the guide rail 321, the contact area of the rolling element rolling groove 322a of the slider 322 with the ball 313 and the rolling surface of the ball 313 are degreased/cleaned, surface-activated, and then coated with a fluorine oil film (not shown) to a thickness of 1 µm. Alternatively, these contact areas are degreased/cleaned, subjected to treatment in an atmospheric plasma treatment, followed by the application of a fluorine-based grease to the rolling element rolling groove 322a.

The method for coating the fluorine oil film is the same as effected in the first embodiment and its description will be omitted.

(Embodiment)

Figure 13:
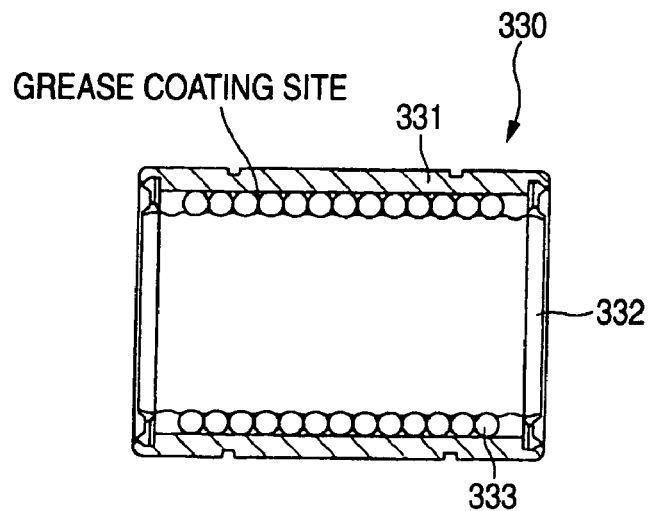
FIG. 13 is a sectional view illustrating a rolling device according to the third embodiment of implementation of the invention comprising a liner guide bearing coated with a filmy lubricant or a fluorine-based grease.

FIG. 13 is a sectional view of a liner guide bearing (rolling device) 330 coated with a filmy lubricant or a fluorine-based grease. The liner guide bearing 330 (nominal count: LB10NY, produced by NSK Ltd.) comprises a thread (inner member) 332, an outer cylinder (outer member) 331 fitted on the thread 332, and a plurality of balls 333 interposed between the thread 332 and the outer cylinder 331 as rolling elements. The contact area of the thread 332 with the ball 333, the contact area of the thread 332 with the ball 333 and the rolling surface of the ball 333 are each degreased/cleaned, surface-activated, and then coated with a fluorine oil film (not shown) or a fluorine grease to a thickness of 0.3 µm.

The method for coating the fluorine oil film is the same as effected in the first embodiment and its description will be omitted.

(Embodiment)

Figure 14:
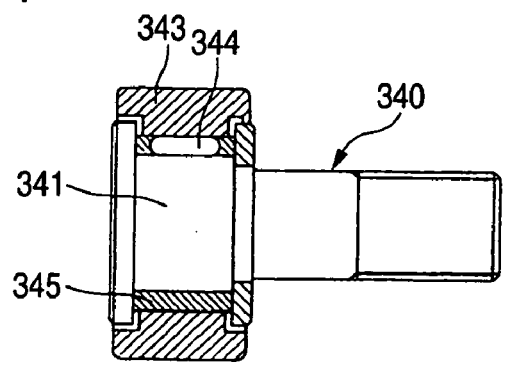
FIG. 14 is a diagram illustrating a rolling device according to the fourth embodiment of implementation of the invention comprising a cam follower coated with a filmy lubricant.
Figure 15:
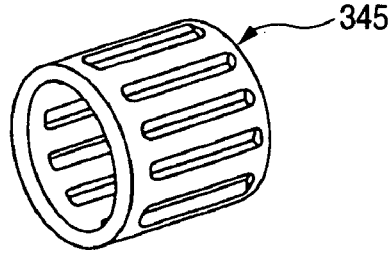
FIG. 15 is a perspective view illustrating the separator of the cam follower of FIG. 14.

FIG. 14 is a sectional view of a cam follower (rolling device) 340 coated with a filmy lubricant. The cam follower 340 comprises a rolling ring (outer member) 343, a plurality of needle rollers (rolling elements) 344 which are peripherally juxtaposed to each other, a stud (inner member) 341, and a separator 345 (see FIG. 15) which retains the needle rollers 344 peripherally at substantially equal intervals. The rolling surface of the rolling ring 343, the needle rollers 344, the stud 341 and the separator 345 are each coated with a fluorine oil film (not shown) to a thickness of 0.3 µm.

The method for coating the fluorine oil film is the same as effected in the first embodiment and its description will be omitted.

(Embodiment)

Figure 16:
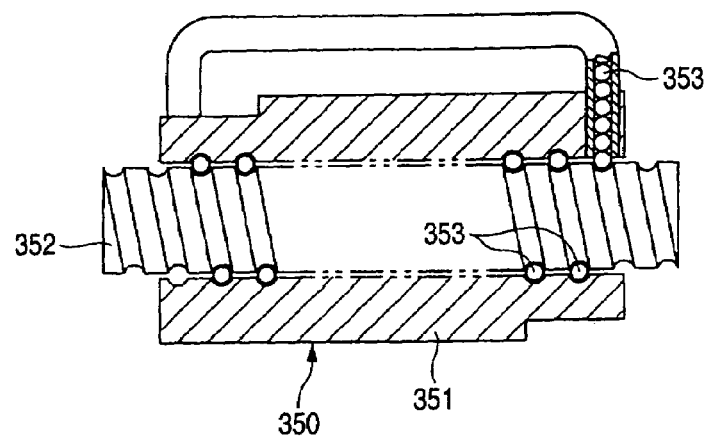
FIG. 16 is a sectional view illustrating a rolling device according to the fifth embodiment of implementation of the invention comprising a ball screw device coated with a fluorine-based grease.

FIG. 16 is a sectional view of a ball screw device (rolling device) coated with a fluorine-based grease. The ball screw device 350 (nominal count: W1503KA, produced by NSK Ltd.) comprises a thread (inner member) 352, a nut (outer member) 351 fitted on the thread 352, and a plurality of balls 353 interposed between the thread 352 and the nut 351 as rolling elements. The nut 351, the ball 353 and the thread 352 are each degreased/cleaned, and then subjected to plasma surface treatment. Thereafter, the surface of the thread is coated with a fluorine-based grease (not shown).

The invention is not limited to the aforementioned embodiments, but proper changes and modifications can be made therein without departing from the spirit and scope thereof.

EXAMPLE

The results of evaluation of performance of rolling device coated with a filmy lubricant will be described hereinafter.

The rolling device was evaluated for durability in the form of linear guide device in vacuum.

As the linear guide device there was used the same linear guide device as used in the second embodiment. Evaluation was made on a linear guide device which had been degreased/cleaned, activated at 300° C. in $NF_3$, and then coated with a fluorine oil (Examples 6 to 8), a linear guide device which had been degreased/cleaned, and then coated with a mixture of a fluorine-containing polymer and a fluorine oil (Comparative Example 9) and a linear guide device which had been degreased/cleaned, and then coated with a fluorine oil (Comparative Examples 7 and 8).

For the evaluation of performance, the linear guide device was measured for frictional force. The time during which the frictional force reaches three times the initial value was defined to be the life of the linear guide device. The results of life is represented relative to that of the linear guide device which had been degreased and coated with a fluorine oil (Comparative Example 7) as 1. The conditions under which the linear guide device is tested are as follows.

Testing linear guide device: nominal count: LS20AL, produced by NSK Ltd.

Material of guide rail, slider and rolling element: SUS440C

Face pressure: 1 GPa

Stroke: 300 mm

Moving rate: 400 mm/s

Vacuum degree: $10^{-4}$ Pa or less

Testing atmosphere: room temperature

The results of durability test are set forth in Table 3.

TABLE 3

| | Pretreatment | Kind of fluorine oil film | Life ratio |
|---|---|---|---|
| Example 6 | Degreasing/cleaning + $NF_3$ activation | Z-25 | 4.5 |
| Example 7 | Degreasing/cleaning + $NF_3$ activation | S-200 | 4.8 |
| Example 8 | Degreasing/cleaning + $NF_3$ activation | 143AC | 4.2 |
| Comparative Example 7 | Degreasing/cleaning | Z-25 | 1 |
| Comparative Example 8 | Degreasing/cleaning | 143AC | 0.8 |
| Comparative Example 9 | Degreasing/cleaning | Z DIAC + Z-25 | 3.5 |

In the column of kind of fluorine oil in Table 3 above, Z-25 indicates FOMBLIN Z-25 (produced by Ausimont K.K.), S-200 indicates DEMNUM S-200 (produced by DAIKIN INDUSTRIES, LTD.), 143AC indicates Krytox 143AC (produced by Du Pont Inc.), and ZDIAC indicates a carboxyl group-modified fluorine oil (produced by Ausimont K.K.).

Evaluation was also made for the generated amount of dust in the form of rolling device in vacuo. The rolling bearing thus evaluated had the same lubrication specification as in the aforementioned linear guide device. In some detail, evaluation was made on a rolling bearing which had been degreased/cleaned, activated at 300° C. in $NF_3$, and then coated with a fluorine oil (Examples 9 to 11), a rolling bearing which had been degreased/cleaned, and then coated with a mixture of a fluorine-containing polymer and a fluorine oil (Comparative Example 12) and a rolling bearing which had been degreased/cleaned, and then coated with a fluorine oil (Comparative Examples 10 and 11).

Figure 17:
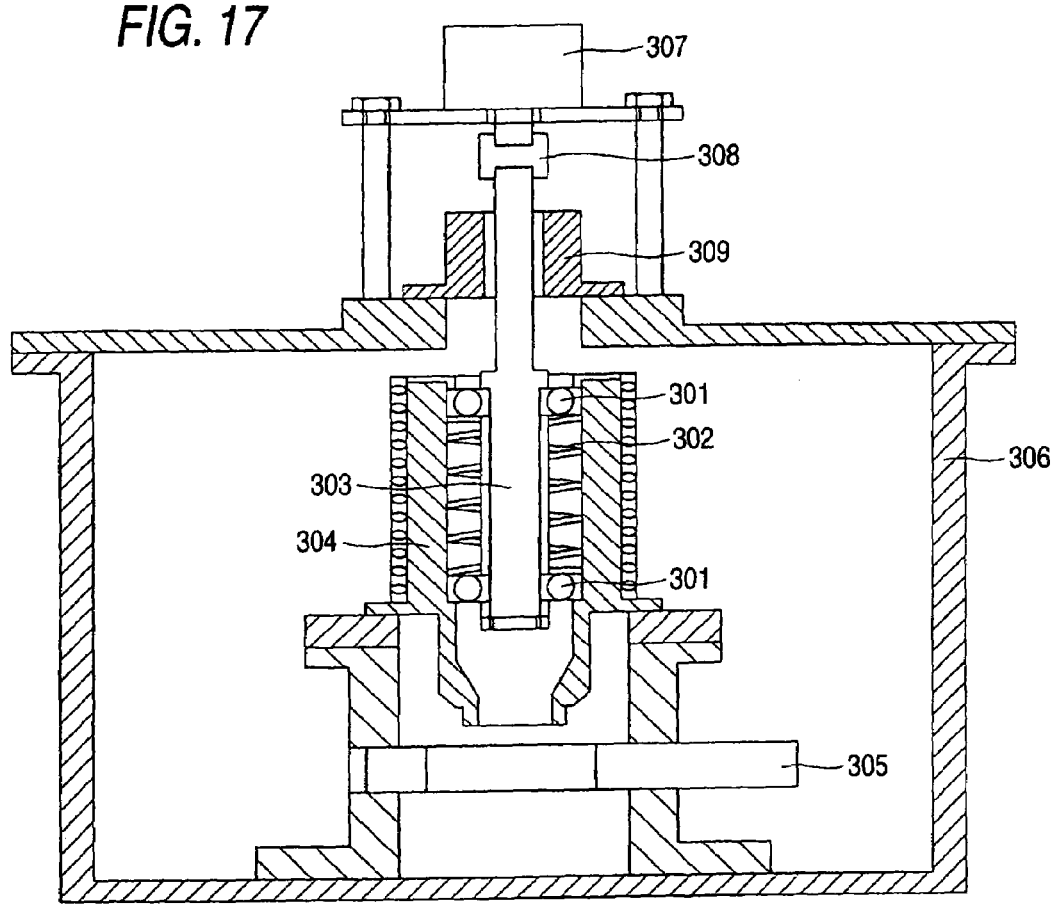
FIG. 17 is a sectional view of a vacuum dust generation testing machine.

For the evaluation of the generated amount of dust, the number of dust (particle size: 0.21 μm or more) generated by the rolling device was counted by a particle counter in a vacuum dust generation testing machine shown in FIG. 17. In FIG. 11, the reference numeral 301 indicates a rolling bearing, the reference numeral 302 indicates a spring, the reference numeral 303 indicates a thread, the reference numeral 304 indicates a housing, the reference numeral 305 indicates a particle counter, the reference numeral 306 indicates a motor, the reference numeral 307 indicates a coupling, and the reference numeral 309 indicates a seal unit. The generated amount of dust is represented relative to that of the rolling bearing coated which had been degreased, and then coated with a fluorine oil (Comparative Example 10) as 1. The testing conditions are as follows.

Testing thread: 608; outer diameter: 22 mm; inner diameter: 8 mm; width: 7 mm (corrugated press retainer)

Material of outer ring, inner ring and rolling element: martensite-based stainless steel comprising 0.45% of C, 13.0% of
Cr and 0.14% of N Face pressure: 1.2 GPa Rotary speed: 1,000 $min^{-1}$ Vacuum degree: $10^{-4}$ Pa or less Testing atmosphere: room temperature The results of dust generation test on the rolling bearing are set forth in Table 4.

TABLE 4

| | Pretreatment | Kind of fluorine oil film | Generated amount of dust |
|---|---|---|---|
| Example 9 | Degreasing/cleaning + $NF_3$ activation | Z-25 | 0.3 |
| Example 10 | Degreasing/cleaning + $NF_3$ activation | S-200 | 0.2 |
| Example 11 | Degreasing/cleaning + $NF_3$ activation | 143AC | 0.5 |
| Comparative Example 10 | Degreasing/cleaning | Z-25 | 1 |
| Comparative Example 11 | Degreasing/cleaning | 143AC | 2.3 |
| Comparative Example 12 | Degreasing/cleaning | Z DIAC + Z-25 | 0.7 |

As can be seen in Tables 3 and 4, the linear guide devices of Examples 7 to 9 which had been surface-activated with a halogen-based gas $NF_3$, and then coated with a fluorine oil exhibited a longer life than the linear guide devices of Comparative Examples 6 to 8. Further, the rolling bearings of Examples 9 to 11 which had been surface-activated with a halogen-based gas NF$_3$, and then coated with a fluorine oil generated less dust than the rolling bearings of Comparative Examples 10 to 12.

Fluorine oils are divided into two groups, i.e., straight-chain fluorine oil and side-chain fluorine oil. The side-chain fluorine oil can easily undergo bond fission at the side chain. The straight-chain fluorine oil is thought to have an excellent outgassing resistance. Thus, the straight-chain fluorine oil is preferably used.

Examples of the straight-chain fluorine oil include FOMBLIN Z (produced by Ausimont K.K.), and DEMNUM (produced by DAIKIN INDUSTRIES, LTD.). Examples of the side-chain fluorine oil include Krytox (produced by Du Pont Inc.).

The following chemical formula 2 indicates a representative structural formula of FOMBLIN Z (produced by Ausimont K.K.). The following chemical formula 3 indicates a representative structural formula of DEMNUM (produced by DAIKIN INDUSTRIES, LTD.). The following chemical formula 4 indicates a representative structural formula of Krytox (produced by Du Pont Inc.).

Chemical Formula (2)

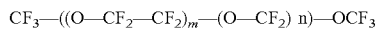
$$CF_3-((O-CF_2-CF_2)_m-(O-CF_2)\ n)-OCF_3$$

Chemical Formula (3)

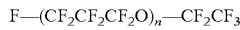
$$F-(CF_2CF_2CF_2O)_n-CF_2CF_3$$

Chemical Formula (4)

$$F-(CF-CF_2-O)_n-CF_2CF_3$$
$$\phantom{F-(}|$$
$$\phantom{F-(}CF_3$$

The results of evaluation of performance of the rolling bearing which has been degreased/cleaned, subjected to plasma surface treatment, and then coated with a grease will be described hereinafter.

Firstly, evaluation was made for durability in the form of linear guide device in vacuo.

As the linear guide device there was used the same linear guide device as used in the second embodiment. Evaporation was made on a linear guide device which had been degreased/cleaned, subjected to atmospheric plasma surface treatment, and then coated with a fluorine-based grease on the track surface (Examples 12 and 14), a linear guide device which had been degreased/cleaned, exposed to argon plasma under reduced pressure to undergo activation, and then coated with a fluorine-based grease on the track surface (Example 13), and a linear guide device which had been degreased/cleaned, and then coated with a fluorine-based grease on the track surface (Comparative Examples 13 and 14).

For the evaluation of performance, the linear guide device was measured for frictional force. The time during which the frictional force reaches three times the initial value was defined to be the life of the linear guide device. The results of life is represented relative to that of the linear guide device which had been degreased/cleaned, and then coated with a fluorine-based grease on the track surface (Comparative Example 13) as 1. The conditions under which the linear guide device is tested are as follows.

Testing linear guide device: nominal count: LS20AL, produced by NSK Ltd.

Material of guide rail, slider and rolling element: SUS440C

Face pressure: 1.5 GPa
Stroke: 300 mm
Moving rate: 400 mm/s
Vacuum degree: $10^{-4}$ Pa or less
Testing atmosphere: room temperature The results of durability test are set forth in Table 3.

TABLE 5

| | Pretreatment | Fluorine-based grease | Life ratio |
|---|---|---|---|
| Example 12 | Degreasing/cleaning + atmospheric plasma | DEMNUM L-200 | 3.5 |
| Example 13 | Degreasing/cleaning + Ar plasma under reduced pressure | DEMNUM L-200 | 4.5 |
| Example 14 | Degreasing/cleaning + atmospheric plasma | FOMBLIN YVAC3 | 3.2 |
| Comparative Example 13 | Degreasing/cleaning | DEMNUM L-200 | 1 |
| Comparative Example 14 | Degreasing/cleaning | FOMBLIN YVAC3 | 0.8 |

In the column of fluorine-based grease in Table 5, DEMNUM L-200 is produced by DAIKIN INDUSTRIES, LTD.) and FOMBLIN YVAC3 is produced by Ausimont K.K.

Evaluation was also made for the generated amount of dust in the form of rolling bearing in vacuo. The rolling bearing thus evaluated had the same lubrication specification as in the aforementioned linear guide device. In some detail, evaluation was made on a rolling bearing which had been degreased/cleaned, subjected to atmospheric plasma surface treatment to undergo activation, and then sealed with a fluorine-based grease (Examples 15 and 17), a rolling bearing device which had been degreased/cleaned, exposed to argon plasma under reduced pressure to undergo activation, and then sealed with a fluorine-based grease (Examples 16), and a rolling bearing which had been degreased/cleaned, and then sealed with a fluorine-based grease (Comparative Examples 15 and 16). For the evaluation of the generated amount of dust, the number of dust (particle size: 0.21 μm or more) generated by the rolling device was counted by a particle counter in a vacuum dust generation testing machine shown in FIG. 17. The generated amount of dust is represented relative to that of the rolling bearing coated which had been degreased, and then sealed with a fluorine-based grease (Comparative Example 15) as 1. The testing conditions are as follows.

Testing thread: 608; outer diameter: 22 mm; inner diameter: 8 mm; width: 7 mm (corrugated press retainer)

Material of outer ring, inner ring and rolling element: martensite-based stainless steel comprising 0.45% of C, 13.0% of Cr and 0.14% of N Face pressure: 1.2 GPa
Rotary speed: 1,000 min$^{-1}$
Vacuum degree: $10^{-4}$ Pa or less
Testing atmosphere: room temperature The results of dust generation test on the rolling bearing are set forth in Table 6.

TABLE 6

| | Pretreatment | Fluorine-based grease | Life ratio |
|---|---|---|---|
| Example 15 | Degreasing/cleaning + atmospheric plasma | DEMNUM L-200 | 0.3 |
| Example 16 | Degreasing/cleaning + Ar plasma under reduced pressure | DEMNUM L-200 | 0.2 |

TABLE 6-continued

|  | Pretreatment | Fluorine-based grease | Life ratio |
| --- | --- | --- | --- |
| Example 17 | Degreasing/cleaning + atmospheric plasma | FOMBLIN YVAC3 | 0.5 |
| Comparative Example 15 | Degreasing/cleaning | DEMNUM L-200 | 1 |
| Comparative Example 16 | Degreasing/cleaning | FOMBLIN YVAC3 | 2.5 |

As can be seen in Tables 5 and 6, the linear guide devices of Examples 12 to 14 which had been subjected to plasma surface treatment to undergo surface activation, and then coated with a fluorine-based grease exhibited a prolonged life as compared with the linear guide devices of Comparative Examples 13 and 14. Further, the rolling bearings of Examples 15 to 17 which had been subjected to plasma surface treatment to undergo surface activation, and then sealed with a fluorine-based grease generated less dust than the rolling bearings of Comparative Examples 15 and 16.

[Embodiment]

Figure 18:
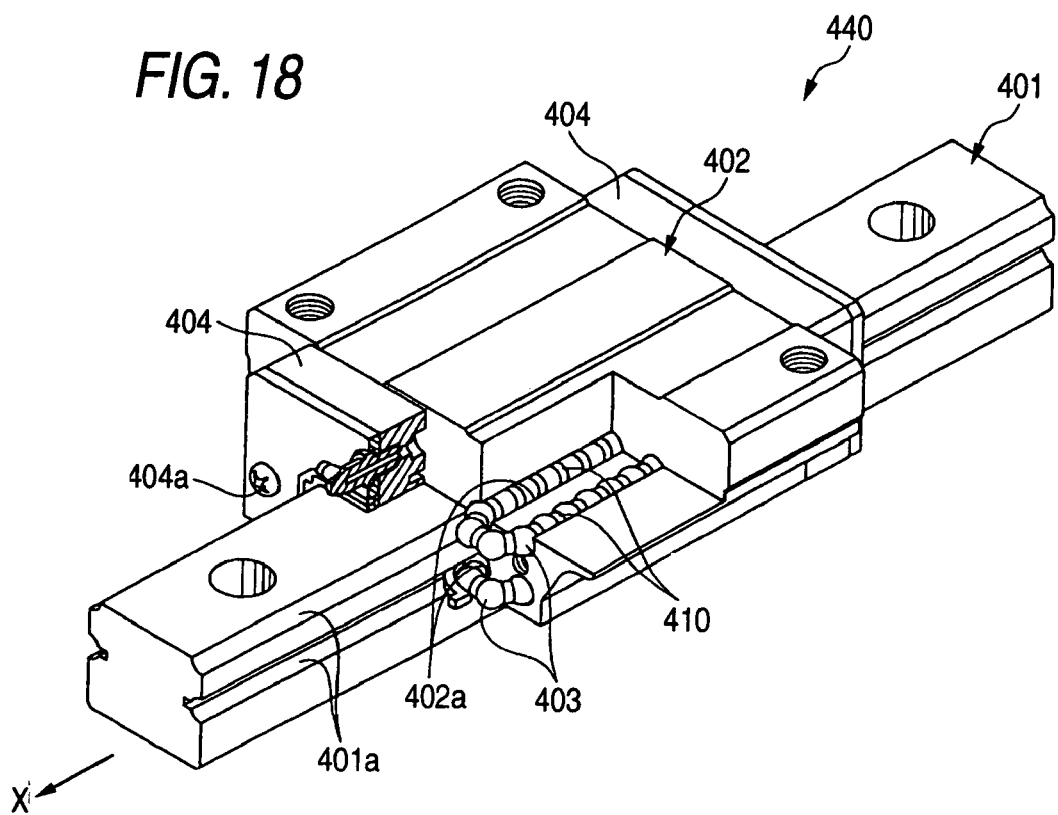
FIG. 18 is a partially sectional view illustrating an example of the arrangement of a linear guide as an embodiment of the rolling device according to the invention.
Figure 19:
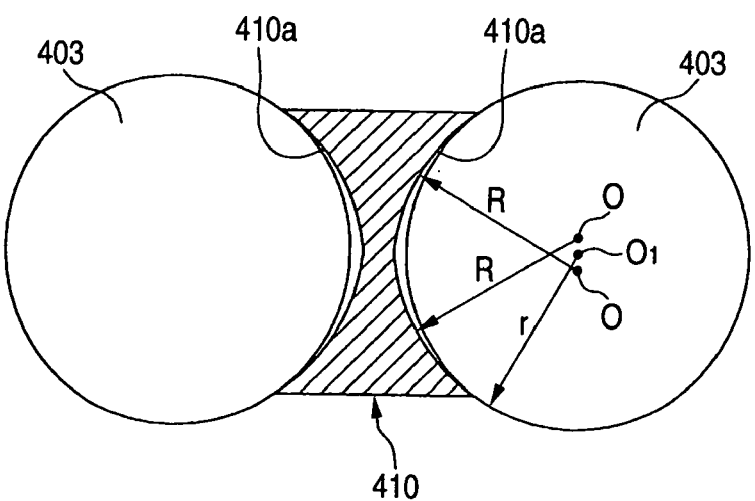
FIG. 19 is an enlarged sectional view illustrating an example of the arrangement of the separator of FIG. 18.

FIG. 18 is a partially sectional perspective view illustrating an example of the arrangement of a linear guide as an embodiment of the rolling device according to the invention. FIG. 19 is a sectional view illustrating an example of the arrangement of the separator of FIG. 18.

A linear guide 440 comprises a guide rail 401 (inner member) having a substantially quadrangular column, a slider (outer member) 402 having a U-shaped section which is disposed across the guide rail 401 in such an arrangement that it can move relative to the guide rail 401, and a plurality of balls 403 (rolling elements) disposed rollably on a ball rolling path formed by a first ball track groove 401a formed on both side faces of the guide rail 401 and a second ball track groove 402a formed on the inner side of the both arms of the slider 402 as shown in FIG. 18.

The slider 402 comprises an end cap 404 releasably provided on the both axial ends thereof with an end cap fixing bolt 404a. Disposed inside the end cap 404 is a U-shaped ball return path connecting between a ball rolling path and a ball circulating path for returning balls 403 which have rolled from one end of the ball rolling path to the other end thereof. The balls 403 can repetitively roll through the ball rolling path through the ball circulating path.

The rolling device is arranged such that when the balls 403 are rolled through the ball rolling path, the slider 402 make straight movement in the longitudinal direction of the guide rail 401 (X direction in FIG. 18).

In the linear guide 440, the adjacent balls 403 have a separator 410 provided disposed therebetween, preventing themselves from competing with each other. The separator 410 is impregnated with a lubricant (not shown).

The members constituting the linear guide 440 will be further described hereinafter.

At least one of the guide rail 401, the slider 402 and the ball 403 is formed by ceramics, hard alloy, stainless steel and cermet, singly or in combination of two or more thereof. In particular, it is preferred that these members be formed by a ceramics material to enhance the abrasion resistance thereof.

Examples of the ceramics material employable herein include silicon nitride($Si_3N_4$)-based ceramics, zirconia ($ZrO_2$)-based ceramics, alumina($Al_2O_3$)-based ceramics, silicon carbide(SiC)-based ceramics, aluminum nitride (AlN)-based ceramics, boron carbide ($B_4C$)-based, titanium boride ($TiB_2$)-based ceramics, boron nitride (BN)-based ceramics, titanium carbide(TiC)-based ceramics, titanium nitride(TiN)-based ceramics, and ceramics-based composite material comprising these compounds in complex. In particular, silicon nitride, which has a light weight and a high fracture toughness, is preferably used. Further, in order to enhance the specific strength or fracture toughness of the members, the ceramics material may comprise a fibrous filler such as silicon carbide whisker, silicon nitride whisker, alumina whisker and aluminum nitride whisker incorporated therein.

Examples of the hard alloy employable herein include WC—Co-based hard alloy, WC—$Cr_3C_2$—Co-based hard alloy, WC—TaC—Co-based hard alloy, WC—TiC—Co-based hard alloy, WC—NbC—Co-based hard alloy, WC—TaC—NbC—Co-based hard alloy, WC—TiC—TaC—NbC—Co-based hard alloy, WC—TiC—TaC—Co-based hard alloy, WC—ZrC—Co-based hard alloy, WC—TiC—ZrC—Co-based hard alloy, WC—TaC—VC—Co-based hard alloy, WC—$Cr_3C_2$—VC—Co-based hard alloy, WC—TiC—$Cr_3C_2$—Co-based hard alloy, WC—TiC—TaC-based hard alloy, and WC—Co—Ni-based hard alloy. Examples of non-magnetic hard alloy having an enhanced corrosion resistance include WC—Ni-based hard alloy, WC—$Cr_3C_2$—$Mo_2C$—Ni-based hard alloy, WC—Ti (C,N)—TaC-based hard alloy, WC—Ti (C,N)-based hard alloy, and $Cr_3C_2$—Ni-based hard alloy.

A representative composition of WC—Co-based hard alloy is W:Co:C=(70.41 to 91.06):(3.00 to 25.00):(4.59 to 5.94). A representative composition of WC—TaC—NbC—Co-based hard alloy is W:Co:Ta:Nb:C=(65.7 to 86.3):(5.8 to 25.0):(1.4 to 3.1):(0.3 to 1.5):(4.7 to 5.8). A representative composition of WC—TiC—TaC—NbC—Co-based hard alloy is W:Co:Ta:Ti:Nb:C=(65.0 to 75.3):(6.0 to 10.7):(5.2 to 7.2):(3.2 to 11.0):(1.6 to 2.4):(6.2 to 7.6). A representative composition of WC—TaC—Co-based hard alloy is W:Co:Ta=(53.51 to 90.30):(3.50 to 25.00):(0.30 to 25.33). A representative composition of WC—TiC—Co-based hard alloy is W:Co:Ti=(57.27 to 78.86):(4.00 to 13.00):(3.20 to 25.59). A representative composition of WC—TiC—TaC—Co-based hard alloy is W:Co:Ta:Ti:C=(47.38 to 87.31):(3.00 to 10.00):(0.94 to 9.38):(0.12 to 25.59):(5.96 to 10.15).

Examples of the stainless steel employable herein include martensite-based stainless steel (JIS SUS440C, 13Cr-based stainless steel, etc.), austenite-based stainless steel (JIS SUS304, SUS316L, etc.), stainless steel obtained by surface-hardening austenite-based stainless steel, and precipitation-hardened stainless steel (JIS SUS630).

Examples of the cermet employable herein include TiC—Ni-based cermet, TiC—Mo—Ni-based cermet, TiC—Co-based cermet, TiC—$Mo_2C$—Ni-based cermet, TiC—$Mo_2C$—ZrC—Ni-based cermet, TiC—$Mo_2C$—Co-based cermet, $Mo_2C$—Ni-based cermet, Ti(C,N)—$Mo_2C$—Ni-based cermet, TiC—TiN—$Mo_2C$—Ni-based cermet, TiC—TiN—$Mo_2C$—Co-based cermet, TiC—TiN—$Mo_2C$—TaC—Ni-based cermet, TiC—TiN—$Mo_2C$—WC—TaC—Ni-based cermet, TiC—WC—Ni-based cermet, Ti(C,N)—WC—Ni-based cermet, TiC—Mo-based cermet, Ti(C,N)—Mo-based cermet, and boride-based (NoB—Ni-based, $B_4C$/(W,Mo)$B_2$-based) cermet. Ti(C,N)—$Mo_2C$—Ni-based cermet, Ti(C,N)—WC—Ni-based cermet and Ti(C,N)-MO-based cermet are alloys obtained by sintering TiC—$Mo_2C$—Ni-based cermet, TiC—WC—Ni-based cermet and TiC—Mo-based cermet, respectively, in nitrogen gas ($N_2$).

Representative examples of the composition of cermet include TiC—30% $Mo_2C$—20% Ni, TiC—19% $Mo_2C$—24% Ni, TiC—8% $Mo_2C$—15% Ni, Ti (C,N)—25% $Mo_2C$—15% Ni, TiC—14% TiN—19% $Mo_2C$—24% Ni, $TiC_{0.7}N_{0.3}$—11% $Mo_2C$—24% Ni, $TiC_{0.7}N_{0.3}$—19% $Mo_2C$—24% Ni, $TiC_{0.7}N_{0.3}$—27% $Mo_2C$—24% Ni, TiC—20% Mo—15% Ni, and TiC—30% Mo—15% Ni.

As shown in FIG. 19, the separator 410 is a column made of a porous material having a plurality of pores in the surface and interior thereof. The separator 410 has a Gothic arch concave surface 410a formed on both the bottom surfaces thereof for retaining the rolling surface of the ball 403. The Gothic arch indicates a shape formed by two curvatures of concave surface 410a having a radius R the center of which deviate from the center $O_1$ of the ball.

The porous material to be used herein is not specifically limited but is preferably a metal material or sinter of polyimide resin powder.

The metal material to be used herein is not specifically limited but may be stainless steel, nickel, titanium, copper, iron, aluminum or alloy thereof.

The polyimide resin (hereinafter referred to as "PI resin") indicates a synthetic resin having excellent heat resistance, chemical resistance, mechanical properties and electrical insulation obtained by the polycondensation of an aromatic carboxylic acid with an aromatic amine. PI resin to be used herein has an imide bond in its main chain. However, polyamideimide resins having an imide bond and an amide bond in its main chain are not included. Such a PI resin has so high a heat resistance that it doesn't melt even under conditions that no heat radiation occurs as in vacuum and thus can exhibit good frictional and abrasion characteristics over a wide temperature range. Further, since PI resin doesn't melt like thermoplastic resin, the porosity in the grain boundary can be freely controlled to render the resin porous.

PI resin to be used herein is not specifically limited but may be UIP-S, R (trade name, produced by Ube Industries, Ltd.), TI-3000 (tradename, produced by TORAY INDUSTRIES, LTD.), VESPEL (trade name, produced by Du Pont Inc.) or AURUM (trade name, Mitsui Chemicals Inc.).

PI resin may comprise a solid lubricant such as PTFE, graphite, molybdenum disulfide and boron nitride incorporated therein to improve the formability or sliding properties thereof.

The method for forming the metal porous material made of metal material is not specifically limited but may be the following method. In some detail, the aforementioned metal material is oxidized in an oxidizing atmosphere to allow an oxide to grow between the metal compounds, causing cracking in the grain boundary thus expanded. Subsequently, the oxide which has grown between the metal compounds is subjected to gas reduction to convert covalent bond to metallic bond, causing $H_2O$ gas to be produced in the crystal grain boundary and hence making it possible to obtain a metallic porous material.

Other examples of the method for producing the metallic porous material include the following methods. To an aqueous slurry containing a metal powder are added a surface active agent and an evaporating foaming agent (hydrophobic volatile organic solvent). The aqueous slurry is then subjected to doctor blade coating to form a thin film. Subsequently, the temperature is raised to cause the evaporating foaming agent to vaporize. The resulting vapor pressure causes the slurry to be directly foamed. The slurry is dried, degreased, and then sintered to obtain a metallic porous material.

Further examples of the method for producing the metallic porous material include a method which comprises sintering a metal fiber to form a metallic porous material, a method which comprises electrically-conducting a foamed urethane, plating the foamed urethane, and then heating the urethane away to form a metallic porous material, and the same method as mentioned above except that plating is replaced by application of a metal powder slurry followed by sintering accompanied by the removal of urethane.

Examples of the method for forming the porous resin material made of resin material include a method which comprises pressure-forming the aforementioned resin material at room temperature, and then baking the material in an inert gas or under pressure, and a forming method involving heating pressure-forming, ram extrusion, CIP, etc. In this case, the average particle diameter or pressure of the resin material which is a starting material can be properly adjusted to form a sinter of polyimide resin powder. In particular, it is preferred that pores be formed in a volume proportion of 10% to 40% to reduce the amount of dust and realize prolonged life.

The particle diameter of PI resin powder which is a starting material is preferably not greater than 40 μm, more preferably from 5 μm to 30 μM. When the particle diameter of PI resin powder exceeds 40 μm, the size of pores between the grains increases, deteriorating the percent retention of lubricating oil (percent retention of oil) to disadvantage.

Examples of the lubricant to be filled in the separator 410 include lubricating oil, and semi-solid lubricating oil (grease).

As the lubricant there is preferably used a lubricating oil comprising a liquid fluorinated polymer oil or alkylated cyclopentane as a main component.

Examples of the liquid fluorinated polymer oil include perfluoropolyether (PFPE), perfluoropolyalkylether (PFEA), trifluoroethylene teromer, and fluorosilicone polymer. Specific examples of these liquid fluorinated polymer oils include FOMBLIN (trade name, produced by Ausimont K.K.), Krytox (trade name, produced by Du Pont Inc.), and DEMNUM (trade name, produced by DAIKIN INDUSTRIES, LTD.).

Examples of the lubricating oil comprising an alkylated cyclopentane as a main component include tri (2-octyldodecyl) cyclopentane, tri-n-octylcyclopentane, tetra-n-octylcyclopentane, penta-n-octylcyclopentane, tri-n-nonylcyclopentane, penta-n-decylcyclopentane, penta-n-dodecylcyclopentane, and tetra-2-ethylhexylcyclopentane. Specific examples of these lubricating oils include synthetic oil 2001A (trade name, produced by Nye Lubricants Inc.).

As the grease there is preferably used a fluorinated polymer which is a mixture of a base oil made of a liquid fluorinated polymer and a thickening agent made of a solid fluorinated polymer. Specific examples of the solid fluorinated polymer include polytetrafluoroethylene (PTFE), copolymer of tetrafluoroethylene and hexafluoropropene, copolymer of tetrafluoroethylene and perfluoropropylvinyl ether, and mixture thereof.

The method for impregnating the separator 410 formed by the aforementioned porous material with a lubricant is not specifically limited. However, in order to facilitate the exclusion of air or water content from the pores, the impregnation is preferably effected under reduced pressure. Alternatively, in order to effect impregnation efficiently, heating may be effected.

In accordance with the linear guide 440 according to the present embodiment, the separator 410 is formed by a porous metal material or a porous material comprising a sinter of polyimide resin powder having a volume porosity of 10% to 40%. In this arrangement, the apparent density of the separator 410 can be reduced to reduce the weight thereof while providing the separator with sufficient functions. Thus, the resulting separator can be provided with stable operating characteristics.

In particular, the porous material constituting the separator 410 can be formed by a metal material, making it possible to further enhance the durability of the separator 410 as well as inhibit the production of gas in the external atmosphere, which has been considered a problem with the related art separator made of polyamide resin.

Further, the porous material constituting the separator 410 can be formed by a sinter of polyimide resin powder having a volume porosity of 10% to 40% to further enhance the heat resistance of the separator. Further, the porosity of the boundary of the sintered grains can be freely adjusted to control the content of lubricant to be filled in the separator and the oozing rate, making it possible to realize further prolongation of the life of the rolling device.

Moreover, the separator 410 can be formed by a porous material to allow the lubricant filled in the separator 410 to be effectively retained in numerous pores present in the surface and interior of the separator 410, making it possible to enhance the seizing resistance of the separator 410 and realize the prolongation of the life of the rolling device.

Further, a lubricant can be effectively retained in numerous pores present in the surface and interior of the separator 410, making it difficult for the lubricant to be scattered during the operation of the linear guide 440 and hence making it possible to inhibit the pollution of the external atmosphere of the rolling device.

Further, the separator 410 is impregnated with a lubricant. In this arrangement, even when a lubricant can be difficultly provided into the contact surface of the ball 403 with the separator 410 or the supply of a lubricant is temporarily suspended during the operation of the linear guide 440, the lubricant filled in the separator 410 is transferred to the ball 403, making it possible to maintain stable operating characteristics. Accordingly, the abrasion resistance and seizing resistance of the linear guide 440 can be further enhanced, making it possible to realize further prolongation of the life of the rolling device.

Further, as the lubricant to be filled in the separator 410 there may be used a lubricating oil comprising a liquid fluorinated polymer oil or alkylated cyclopentane as a main component or a fluorinated grease. Since such a lubricant has an extremely low volatility and thus vaporizes relatively little in vacuo or at high temperatures, the pollution in the external atmosphere due to scattering and evaporation of particles or gases can be minimized.

Moreover, at least one of the guide rail 401, the slider 402 and the ball 403 can be formed by ceramics, hard alloy, stainless steel and cermet, singly or in combination of two or more thereof to drastically lessen the impact of these members against the separator 410, making it possible to secure stable operating characteristics and hence realize further prolongation of the life of the linear guide 440.

[Embodiment]

Figure 20:
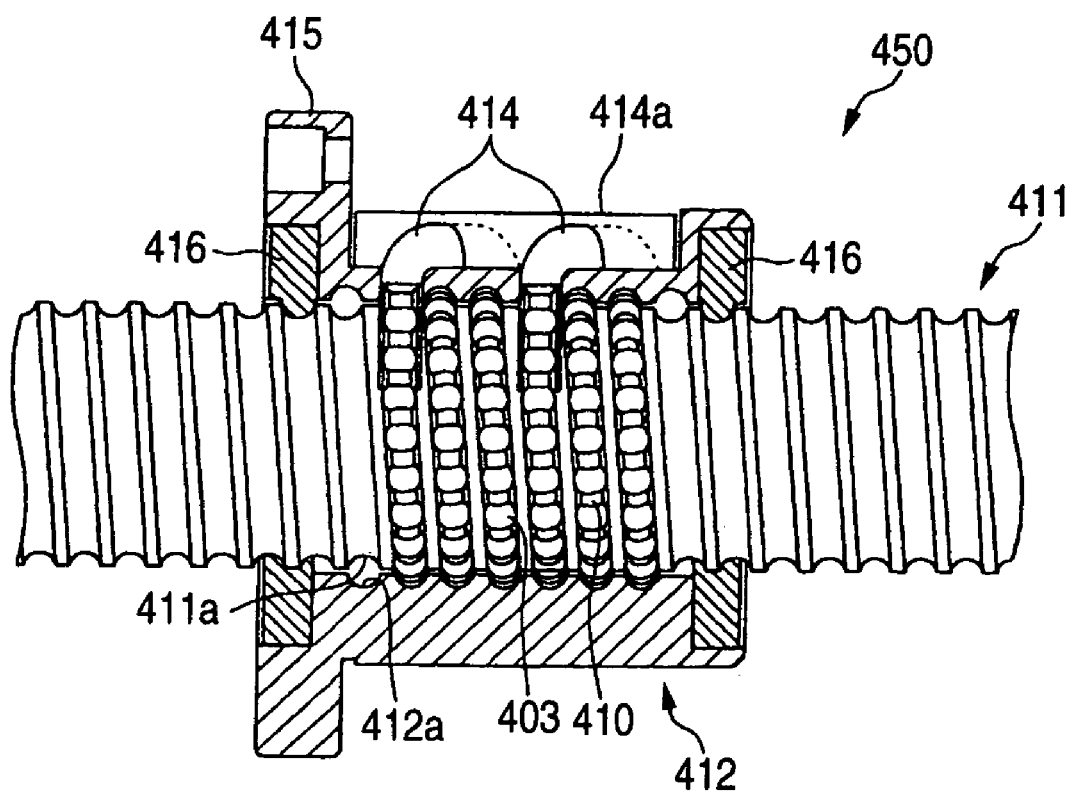
FIG. 20 is a partially sectional perspective view illustrating an example of the arrangement of a ball screw as another embodiment of the rolling device according to the invention.

FIG. 20 is a sectional view illustrating an example of the arrangement of a ball screw as another embodiment of the rolling device according to the invention.

As shown in FIG. 20, the ball screw 450 according to the present embodiment comprises a thread (inner member) 411 having a first spiral thread groove 411a provided on the outer surface thereof, a nut (outer member) 412 having a second thread groove 412a provided on the inner surface thereof opposed to the first thread groove 411a, and a plurality of balls (rolling elements 403 rollably disposed on a ball rolling path formed between the first thread groove 411a and the second thread groove 412a.

To one end of the ball rolling path is fixed a return tube (ball circulating path) 414 for catching the balls 403 which have rolled and feeding the balls 403 to the other end of the ball rolling path by a tube press bar 414a. Further, at one axial end of the nut 412 is formed a flange 415 for fixing the nut 412 to a table or the like. The gap between the flange 415 and the thread 411 and the gap between the axial other end of the nut 412 and the thread 411 are blocked by a dust-proof seal 416.

The ball screw 450 is arranged such that when the thread and the nut 412 are rotated relative to each other to move one of the two members in the axial direction, the thread 411 and the nut 412 make relative spiral movement.

In the ball screw 450, the adjacent balls 403 have the same separator 410 as used in the first embodiment interposed therebetween, preventing themselves from competing with each other. The separator 410 is impregnated with a lubricant (not shown).

The thread 411, the nut 412 and the ball 403 constituting the ball screw 450 and the lubricant are formed by the same constituents as used in the first embodiment.

Thus, the ball screw 450 according to the present embodiment can exert the same effect as the first embodiment.

While the first and second embodiments have been described with reference to the separator 410 having a columnar shape, the separator may be prismatic or in any other form. While the separator 410 has been described with reference to one having a Gothic arch concave surface 410a, the shape of the concave surface 410a is not limited thereto. For example, the concave surface 410a may be an arc or cone having a radius R close to the radius of the ball 403. The separator 410 may be rounded at the edge opposed to the ball 403.

While the first and second embodiments have been described with reference to the case where the invention is applied to the linear guide 440 or ball screw 450 as rolling device, the application of the invention is not limited thereto. The invention can be applied to other rolling devices.

EXAMPLE

The advantages of the invention will be studied in the following examples.

EXAMPLE

A ball screw (thread diameter: 15 mm; lead: 10 mm) was prepared from the constituent materials set forth in Table 7. The separator used had a Gothic arch concave surface as shown in FIG. 19. The separator was prepared by subjecting the forming materials (1) to (5) to machining or injection molding.

(1) Nickel-chromium-based porous metal material (Cermet Ni—Cr #5; porosity: 50%; average pore diameter: 0.6 mm, produced by Sumitomo Electric Industries, Ltd.)
(2) Stainless steel-based porous metal material (sintered KC metal fiber; porosity: 50%; average pore diameter: 0.6 mm, produced by Kogi Co., Ltd.)
(3) Polyamide PA66 (Ultramit A, produced by BASF Japan Co., Ltd.)
(4) PFPE oil (Vaarierta Oil IS/V, produced by NOK Kluver Co., Ltd.)
(5) Fluorine-based grease (L200, produced by DAIKIN INDUSTRIES, LTD.)

Figure 21:
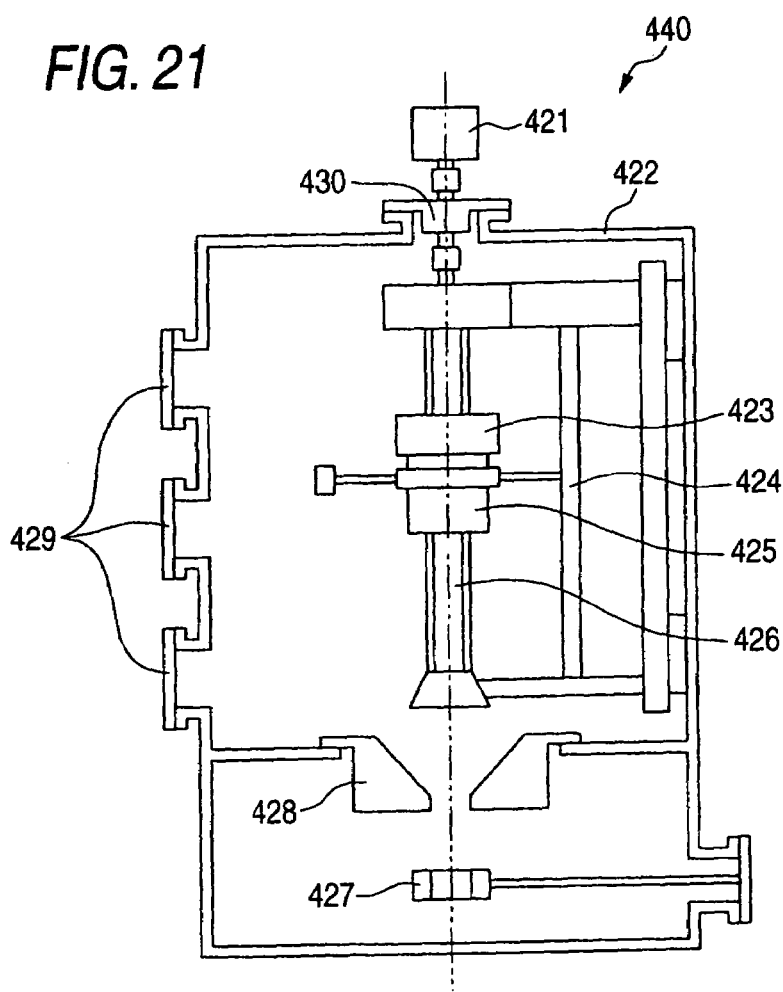
FIG. 21 is a schematic diagram illustrating a vacuum ball screw testing machine.

The ball screws thus prepared were each then subjected to durability test and measured for generated amount of dust on a vacuum ball screw testing machine shown in FIG. 21 under the following operating conditions. In FIG. 21, the reference numeral 440 indicates a vacuum ball screw testing machine, the reference numeral 421 indicates an AC turbo motor, the reference numeral 422 indicates a vacuum tank, the reference numeral 423 indicates a weight, the reference numeral 424 indicates a rotation stop, the reference numeral 425 indicates a nut, the reference numeral 426 indicates a ball screw, the reference numeral 427 indicates a particle sensor, the reference numeral 428 indicates a dust-collecting funnel, the reference numeral 429 indicates an observation window, and the reference numeral 430 indicates a magnetic fluid seal unit.

[Operating Conditions of Vacuum Ball Screw Testing Machine]
Pressure: $1 \times 10^{-4}$ Pa
Temperature conditions: room temperature
Rotary speed: 500 min$^{-1}$
Load: 39.2 N
Stroke: 200 mm

[Durability Test]
When the vacuum ball screw testing machine was rocked, it was judged that the life of the ball screw had been expired.

[Test for Measurement of Generated Amount of Dust]
Using a laser beam scattering particle counter disposed under the ball screw in the vacuum ball screw testing machine, the number of dust particles having a size of not smaller than 0.21 μm thus generated was measured. For the measurement of generated amount of dust, sampling was conducted in 3 minutes every 30 minutes after 30 minutes from the beginning of the test until it was conducted five times. The measurements were then averaged to determine the generated amount of dust.

The results of durability test and measurements of generated amount of dust are set forth in Table 7 relative to that of Comparative Example 17 as 1.

As can be seen in Table 7, Examples 18 to 21, which each comprise a separator made of a porous material, showed an enhanced durability and a reduced generated amount of dust as compared with Comparative Examples 17 to 19. In particular, the results of Examples 19 and 20 show that the formation of rolling element, which is a member other than separator, by ceramics results in drastic enhancement of durability. Further, the results of Examples 19 and 21 show that the use of a fluorine-based grease as a lubricant to be filled in the separator results in drastic reduction of generated amount of dust as compared with a liquid fluorinated polymer oil.

EXAMPLE

Figure 22:
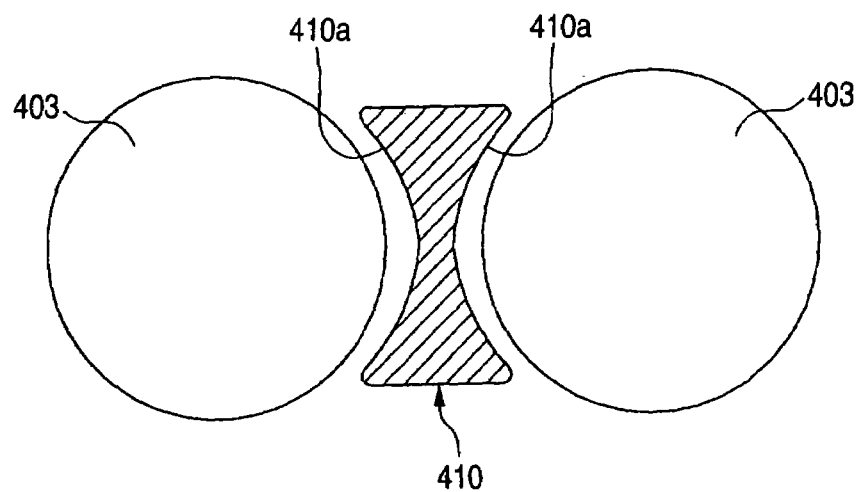
FIG. 22 is an enlarged sectional view illustrating another example of the arrangement of the separator of the invention.

A totally aromatic polyimide (TI-3000, produced by TORAY INDUSTRIES, INC.) was formed and sintered at a forming pressure of 4,000 kgf/cm$^2$ and a baking temperature of 350° C. in a nitrogen atmosphere for 2 hours. As a result, a separator made of a porous sintered product having a concave surface with a radius R of curvature close to the radius of the rolling element and a porosity of 30% as shown in FIG. 22 was obtained.

The separator thus obtained was then dipped in a fluorine oil (DEMNUM S-200, produced by DAIKIN INDUSTRIES, LTD.) and an alkylated cyclopentane (synthetic oil 2001A, produced by Nye Lubricants Inc.). The pressure of the atmosphere was then reduced to 1 Torr to cause the lubricants to be filled in the pores of the separator.

The extra lubricants were then wiped from the surface of the separator with a clean cloth. The separator was then incorporated in a ball screw made of SUS440C (W1503Ka, produced by NSK Ltd.).

Using the same testing machine as used in the first example, the ball screw thus prepared was then subjected to durability test and measured for generated amount of dust under the following conditions with the separator porosity and the lubricant film on the rolling members such as nut and rolling element varied as shown in Table 8. The results of

TABLE 7

| | Thread | Separator | Rolling element | Durability | Generated amount of dust |
|---|---|---|---|---|---|
| Example 18 | SUS440C | Nickel-chromium-based porous material (impregnated with PFPE oil) | SUS440C | 10 | 0.01 |
| Example 19 | SUS440C | Stainless steel-based porous metal material (impregnated with PFPE oil) | SUS440C | 11 | 0.005 |
| Example 20 | SUS440C | Stainless steel-based porous metal material (impregnated with PFPE oil) | Silicon nitride | 20 | 0.003 |
| Example 21 | SUS440C | Stainless steel-based porous metal material (impregnated with fluorine-based grease) | SUS440C | 22 | 0.001 |
| Comparative Example 17 | SUS440C | PA66 | SUS440C | 1 | 1 |
| Comparative Example 18 | SUS440C | PA66 (impregnated and coated with PFPE oil) | SUS440C | 2 | 0.2 |
| Comparative Example 19 | SUS440C | PA66 (impregnated and coated with fluorine-based grease) | SUS440C | 3.5 | 0.4 | durability test and measurements of generated amount of dust are set forth in Table 8 relative to that of Comparative Example 17 as 1.

[Conditions of Durability Test]
Load (toward bearing): 110N (double nut system)
Stroke: 180 mm
Shaft rotary speed: 2,000 min$^{-1}$
Vacuum degree: $2 \times 10^{-4}$ Pa For the judgment of life under the durability test conditions, the time at which three times the initial torque is reached was determined.

[Conditions of Test for Measurement of Generated Amount of Dust]
Load (dead weight): 50N (single nut system)
Stroke: 300 mm
Vacuum degree: $2 \times 10^{-4}$ Pa
Testing time: 24 hours

TABLE 8

|  | Separator | Life ratio | Generated amount of dust |
| --- | --- | --- | --- |
| Example 22 | 30% porosity | 12.5 | 1.3 |
| Example 23 | 30% porosity | 13.1 | 1.5 |
| Example 24 | 10% porosity | 9.5 | 1.1 |
| Example 25 | 20% porosity | 11.2 | 1.2 |
| Example 26 | 40% porosity | 14.3 | 2.4 |
| Example 27 | 30% porosity | 25.5 | 1.1 |
| Comparative Example 20 | None | 1 | 1 |
| Comparative Example 21 | None | 3.0 | 0.9 |
| Comparative Example 22 | None | 2.1 | 2.1 |
| Comparative Example 23 | 0% porosity | 1.3 | 0.9 |
| Comparative Example 24 | 5% porosity | 2.4 | 1.1 |
| Comparative Example 25 | 50% porosity | 14.6 | 4.7 |

Example 22, Examples 24 to 26, Comparative Example 20, and Comparative Examples 24 and 25 in Table 8 each had a thread, a nut, rolling elements and a circulating tube coated with a mixture of a fluorine-containing polymer (FOMBLIN Z DIAC) and a fluorine oil (DEMNUM S-200) to a thickness of 1 μm. Example 23 and Comparative Example 22 in Table 8 each had a thread, a nut, rolling elements and a circulating tube coated with an alkylated cyclopentane (synthetic oil 2001A, produced by Nye Lubricants Inc.) to a thickness of 1 μm. Example 27 and Comparative Example 21 in Table 8 each had a thread coated with a diamond-like carbon (DLC) to a thickness of 2 μm.

Figure 23:
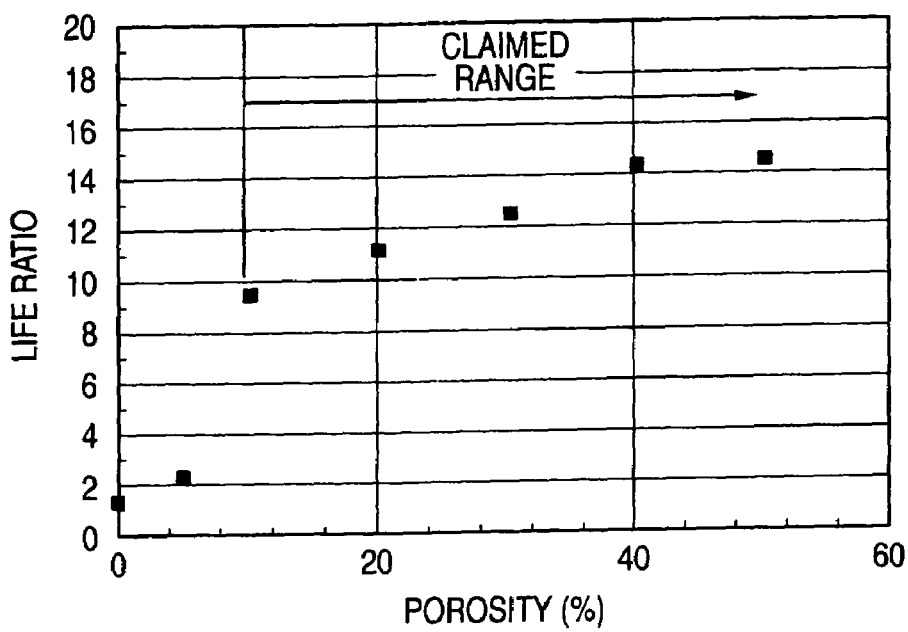
FIG. 23 is a diagram illustrating the relationship between the porosity and the life of a separator formed by a sinter of polyimide resin powder.

FIG. 23 is a diagram illustrating the relationship between the porosity and the life of a separator formed by a sinter of polyimide resin powder.

Figure 24:
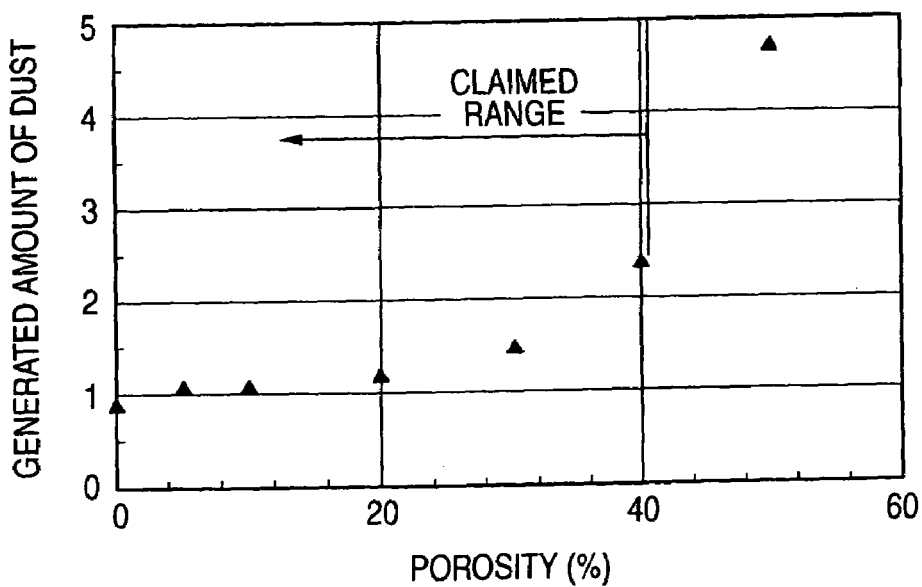
FIG. 24 is a diagram illustrating the relationship between the porosity and the generated amount of dust of the separator formed by a sinter of polyimide resin powder.

FIG. 24 is a diagram illustrating the relationship between the porosity and the generated amount of dust of the separator formed by a sinter of polyimide resin powder. As can be seen in Table 8, Examples 22 to 27, which each comprise a separator made of a sinter of polyimide resin powder having a volume porosity of 10% to 40%, show an enhanced durability and a reduced generated amount of dust as compared with the comparative examples. In particular, the results of Example 27 show that the formation of a separator by a sinter of polyimide resin powder having a volume porosity of 30% and the coating of the thread with a diamond-like carbon to a thickness of 2 μm make it possible to drastically raise the life ratio and the generated amount of dust.

As can be seen in the results of Comparative Examples 23 to 25 and FIGS. 23 and 24, when the porosity of the separator falls below 10%, the generated amount of dust can be drastically reduced, but the life ratio is drastically as well. Further, when the porosity of the separator exceeds 40%, the life ratio can be enhanced, but the generated amount of dust increases.

As mentioned above, the liner motion device of the invention is provided with a separator made of a synthetic resin containing a lubricating oil in an amount of 3 to 25% by volume. In this arrangement, the liner motion device of the invention can be kept operative and lubricated even when the amount of the grease filled therein is reduced. Thus, the liner motion device of the invention can keep a low noise level, giving a higher reliability.

The rolling device such as ball screw according to the invention generates a reduced amount of dust and exhibits an excellent durability even when used in vacuum atmosphere.

As mentioned above, the rolling device of the invention is subjected to surface activation, and then coated, or sealed or covered merely with a lubricant film free of fluorine-containing polymer having a relatively high vapor pressure and thus causes the lubricant to vaporize little, generates less dust and exhibits a prolonged life in vacuo or clean atmosphere.

Further, the plasma surface treatment enhances the wettability of the matrix by the lubricant, causing the base oil to be chemically adsorbed by the track surface and hence making it possible to reduce the generated amount of dust from the lubricant even at high temperatures, at a high operating speed or in high vacuum atmosphere and prolong the life of the rolling device.

Accordingly, a rolling device can be provided which can be used in an atmosphere such as in semiconductor producing machine, liquid crystal panel producing machine and food processor requiring a clean atmosphere and in a high vacuum, at high temperatures, at a high operating speed or in a clean atmosphere with little dust generation and outgassing and an excellent torque life.

As mentioned above, the rolling device of the invention has a separator made of a porous material, making it possible to provide a rolling device with a prolonged life and inhibit the pollution in the external atmosphere of the rolling device.

The use of the separator for rolling device of the invention makes it easy to realize the rolling device of the invention.

What is claimed is:
1. A liner motion device comprising:
a liner motion element fitted on a shaft and moving straight along the shaft;
a plurality of balls which are retained in a rolling element groove formed on the inner side of the liner motion element and roll over between the rolling element groove and the shaft;
a separator interposed between the rolling elements; and,
a circulating path formed in the liner motion element through which the rolling elements are circulated from one end of the rolling element groove to the other,
wherein the separator is a product of a synthetic resin containing a lubricating oil in an amount of 3 to 25% by volume.

2. The liner motion device according to claim 1, wherein the concave surface of the separator for retaining the rolling element has a concentric or spiral groove formed thereon.

3. The liner motion device according to claim 1, wherein the concave surface of the separator for retaining the rolling element is roughened.

4. The liner motion device according to claim 1, wherein the separator is pierced with a hole extending between one concave surface and the other concave surface thereof.

* * * * *